United States Patent
Stenzler

(10) Patent No.: US 10,661,184 B2
(45) Date of Patent: *May 26, 2020

(54) AMUSEMENT PARK ELEMENT TRACKING SYSTEM

(71) Applicant: Universal City Studios LLC, Universal City, CA (US)

(72) Inventor: Paula Stenzler, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,549

(22) Filed: Dec. 5, 2017

(65) Prior Publication Data

US 2018/0104600 A1 Apr. 19, 2018

Related U.S. Application Data

(63) Continuation of application No. 15/464,093, filed on Mar. 20, 2017, now Pat. No. 9,839,855, which is a
(Continued)

(51) Int. Cl.
*A63G 31/00* (2006.01)
*G08B 21/02* (2006.01)
(Continued)

(52) U.S. Cl.
CPC ............. *A63G 7/00* (2013.01); *G01S 17/06* (2013.01); *G05B 15/02* (2013.01);
(Continued)

(58) Field of Classification Search
CPC ......... G06K 9/3216; G06K 2009/3225; A63G 2031/002; A63G 31/02; A63G 31/007
See application file for complete search history.

(56) References Cited

U.S. PATENT DOCUMENTS 2,170,160 A 8/1939 Renshaw et al.
3,743,217 A 7/1973 Turck
(Continued)

FOREIGN PATENT DOCUMENTS

CN 201189396 2/2009
EP 1125801 A2 8/2001
(Continued)

OTHER PUBLICATIONS

Chen, X.; "Capturing Fast Motion with Consumer Grade Unsynchronized Rolling-Shutter Cameras"; The University of British Columbia 2012, pp. 1-85.
(Continued)

*Primary Examiner* — Hai Phan
*Assistant Examiner* — Son M Tang
(74) *Attorney, Agent, or Firm* — Fletcher Yoder, P.C.

(57) ABSTRACT

A system includes one or more retro-reflective markers positioned within a ride system and a tracking system that may detect the one or more retro-reflective markers to track a position of a rider. The tracking system includes an emitter that may emit light toward the one or more retro-reflective markers, a detector that may detect reflected light from the one or more retro-reflective markers, and a controller that may determine the position of the rider relative to the one or more retro-reflective markers based on detection of the reflected light and that may provide an indication of the position of the rider.

20 Claims, 13 Drawing Sheets

Related U.S. Application Data continuation of application No. 14/673,643, filed on Mar. 30, 2015, now Pat. No. 9,600,999.

(60) Provisional application No. 62/001,551, filed on May 21, 2014.

(51) Int. Cl.
    *G08B 21/22*     (2006.01)
    *A63G 7/00*     (2006.01)
    *G06K 9/00*     (2006.01)
    *G06K 9/32*     (2006.01)
    *G06K 9/46*     (2006.01)
    *G01S 17/06*     (2006.01)
    *G05B 15/02*     (2006.01)
    *G08B 21/18*     (2006.01)
    *B60R 22/48*     (2006.01)

(52) U.S. Cl.
CPC ..... *G06K 9/00369* (2013.01); *G06K 9/00758* (2013.01); *G06K 9/3216* (2013.01); *G06K 9/4661* (2013.01); *G08B 21/18* (2013.01); *G08B 21/22* (2013.01); *B60R 2022/4816* (2013.01)

(56) References Cited

U.S. PATENT DOCUMENTS

| | | | |
|---|---|---|---|
| 4,254,433 A | 3/1981 | Dewar, Jr. et al. | |
| 4,662,756 A | 5/1987 | Duran | |
| 4,855,915 A | 8/1989 | Dallaire | |
| 4,988,300 A | 1/1991 | Yamaguchi et al. | |
| 5,015,933 A * | 5/1991 | Watkins | A63G 31/16 318/567 |
| 5,161,104 A | 11/1992 | Fox et al. | |
| 5,365,184 A | 11/1994 | Callender | |
| 5,365,266 A | 11/1994 | Carpenter | |
| 5,527,221 A | 6/1996 | Brown et al. | |
| 5,623,878 A * | 4/1997 | Baxter | A63G 1/30 104/154 |
| 5,682,331 A | 10/1997 | Berlin et al. | |
| 5,809,161 A | 9/1998 | Auty et al. | |
| 5,877,707 A | 3/1999 | Kowalick | |
| 5,910,769 A * | 6/1999 | Geisler | G08B 13/1481 186/62 |
| 6,008,800 A | 12/1999 | Pryor | |
| 6,176,837 B1 | 1/2001 | Foxlin | |
| 6,342,706 B1 * | 1/2002 | Takeda | G08B 13/184 250/200 |
| 6,474,159 B1 | 11/2002 | Foxlin et al. | |
| 6,487,975 B1 * | 12/2002 | Gordon | A63G 7/00 104/295 |
| 6,563,594 B2 * | 5/2003 | Mikami | G03F 7/70633 250/559.3 |
| 6,587,297 B1 * | 7/2003 | Padden | G11B 19/10 360/133 |
| 6,665,079 B1 | 12/2003 | Tocci et al. | |
| 6,720,949 B1 | 4/2004 | Pryor et al. | |
| 6,761,637 B2 | 7/2004 | Weston et al. | |
| 6,784,826 B2 | 8/2004 | Kane et al. | |
| 6,831,603 B2 | 12/2004 | Menache | |
| 6,967,566 B2 | 11/2005 | Weston et al. | |
| 7,084,859 B1 | 8/2006 | Pryor | |
| 7,089,148 B1 | 8/2006 | Bachmann et al. | |
| 7,098,891 B1 | 8/2006 | Pryor | |
| 7,184,022 B2 | 2/2007 | Xie et al. | |
| 7,257,237 B1 | 8/2007 | Luck et al. | |
| 7,307,617 B2 | 12/2007 | Wilson et al. | |
| 7,356,172 B2 | 4/2008 | Fan et al. | |
| 7,395,181 B2 | 7/2008 | Foxlin | |
| 7,401,783 B2 | 7/2008 | Pryor | |
| 7,445,550 B2 | 11/2008 | Barney et al. | |
| 7,466,843 B2 | 12/2008 | Pryor | |
| 7,489,303 B1 | 2/2009 | Pryor | |
| 7,500,917 B2 | 3/2009 | Barney et al. | |
| 7,502,126 B2 | 3/2009 | Ong | |
| 7,505,033 B2 | 3/2009 | Guo et al. | |
| 7,519,537 B2 | 4/2009 | Rosenberg | |
| 7,618,323 B2 | 11/2009 | Rothschild et al. | |
| 7,623,115 B2 | 11/2009 | Marks | |
| 7,671,851 B1 | 3/2010 | Pryor | |
| 7,704,135 B2 | 4/2010 | Harrison, Jr. | |
| 7,755,608 B2 | 7/2010 | Chang et al. | |
| 7,775,439 B2 | 8/2010 | Kimber et al. | |
| 7,775,883 B2 | 8/2010 | Smoot et al. | |
| 7,843,429 B2 | 11/2010 | Pryor | |
| 7,850,527 B2 | 12/2010 | Barney et al. | |
| 7,850,531 B2 | 12/2010 | Brunetti et al. | |
| 7,850,532 B2 | 12/2010 | Scherzinger et al. | |
| 7,850,533 B2 | 12/2010 | Osterman et al. | |
| 7,850,534 B2 | 12/2010 | Smith | |
| 7,850,535 B2 | 12/2010 | Noble et al. | |
| 7,850,536 B1 | 12/2010 | Fitzgerald | |
| 7,850,537 B2 | 12/2010 | Stern | |
| 7,850,538 B1 | 12/2010 | Yoon | |
| 7,850,539 B2 | 12/2010 | Quinn | |
| 7,850,540 B2 | 12/2010 | Sander et al. | |
| 7,850,541 B2 | 12/2010 | Meyer et al. | |
| 7,850,542 B2 | 12/2010 | Cackett et al. | |
| 7,850,543 B2 | 12/2010 | Rice et al. | |
| 7,850,544 B2 | 12/2010 | Meyer et al. | |
| 7,850,545 B2 | 12/2010 | Wada et al. | |
| 7,850,546 B2 | 12/2010 | Chao et al. | |
| 7,850,547 B2 | 12/2010 | Umezawa et al. | |
| 7,850,548 B2 | 12/2010 | Watanabe et al. | |
| 7,850,549 B2 | 12/2010 | Sullivan et al. | |
| 7,850,550 B2 | 12/2010 | Nania et al. | |
| 7,850,551 B2 | 12/2010 | Barber | |
| 7,850,552 B2 | 12/2010 | Marty et al. | |
| 7,850,553 B2 | 12/2010 | Goldsmith et al. | |
| 7,850,554 B2 | 12/2010 | Burger | |
| 7,850,555 B2 | 12/2010 | Keane et al. | |
| 7,850,556 B2 | 12/2010 | Meggiolan | |
| 7,850,557 B2 | 12/2010 | Moriya et al. | |
| 7,850,558 B2 | 12/2010 | Oh | |
| 7,850,559 B2 | 12/2010 | Botez et al. | |
| 7,850,560 B2 | 12/2010 | Arneth et al. | |
| 7,850,561 B2 | 12/2010 | Wilhelm et al. | |
| 7,850,562 B2 | 12/2010 | DeGroot | |
| 7,850,563 B2 | 12/2010 | Jinno et al. | |
| 7,850,564 B2 | 12/2010 | Nonoshita | |
| 7,850,565 B2 | 12/2010 | Junig et al. | |
| 7,850,566 B2 | 12/2010 | Kim | |
| 7,850,567 B2 | 12/2010 | Kramer et al. | |
| 7,850,568 B2 | 12/2010 | Shim | |
| 7,850,569 B2 | 12/2010 | Seo et al. | |
| 7,850,570 B2 | 12/2010 | Jager et al. | |
| 7,850,571 B2 | 12/2010 | Yeo | |
| 7,850,572 B2 | 12/2010 | Hwang et al. | |
| 7,854,655 B2 | 12/2010 | Mao et al. | |
| 7,863,551 B2 | 1/2011 | Bang et al. | |
| 7,874,918 B2 | 1/2011 | Osnato et al. | |
| 7,896,742 B2 | 3/2011 | Weston et al. | |
| 7,905,769 B1 | 3/2011 | Harrison, Jr. | |
| 7,918,733 B2 | 4/2011 | Zalewski et al. | |
| 7,927,216 B2 | 4/2011 | Ikeda et al. | |
| 7,996,793 B2 | 8/2011 | Latta et al. | |
| 8,040,328 B2 | 10/2011 | Smith et al. | |
| 8,058,975 B2 | 11/2011 | Barnardo et al. | |
| 8,079,916 B2 * | 12/2011 | Henry | A63G 3/02 472/117 |
| 8,209,134 B2 | 6/2012 | Parker et al. | |
| 8,228,305 B2 | 7/2012 | Pryor | |
| 8,248,367 B1 | 8/2012 | Barney et al. | |
| 8,287,374 B2 | 10/2012 | Pryor | |
| 8,306,635 B2 | 11/2012 | Pryor | |
| 8,339,274 B2 | 12/2012 | Van De Sluis et al. | |
| 8,538,562 B2 | 9/2013 | Pryor et al. | |
| 8,553,079 B2 | 10/2013 | Pryor | |
| 9,764,245 B2 * | 9/2017 | Weston | A63G 21/18 |
| 9,773,163 B2 * | 9/2017 | Carey | H04N 7/183 |

(56) References Cited

U.S. PATENT DOCUMENTS

| | | |
|---|---|---|
| 2003/0044091 A1* | 3/2003 | Swanson .......... G06K 17/0032 382/321 |
| 2003/0048926 A1 | 3/2003 | Watanabe |
| 2003/0069077 A1 | 4/2003 | Korienek |
| 2004/0102247 A1 | 5/2004 | Smoot et al. |
| 2004/0166937 A1 | 8/2004 | Rothschild et al. |
| 2004/0178955 A1 | 9/2004 | Menache et al. |
| 2005/0080533 A1 | 4/2005 | Basir et al. |
| 2005/0083333 A1 | 4/2005 | Gordon |
| 2005/0143173 A1 | 6/2005 | Barney et al. |
| 2005/0225481 A1 | 10/2005 | Bonthron |
| 2005/0263992 A1* | 12/2005 | Matsuda .......... G01S 5/163 280/735 |
| 2006/0017271 A1 | 1/2006 | Muller |
| 2006/0030385 A1 | 2/2006 | Barney |
| 2006/0055706 A1* | 3/2006 | Perlman .......... A63F 13/06 345/589 |
| 2006/0067546 A1 | 3/2006 | Lewis et al. |
| 2006/0067572 A1 | 3/2006 | White et al. |
| 2006/0125691 A1 | 6/2006 | Menache et al. |
| 2006/0128487 A1 | 6/2006 | Johnson |
| 2006/0154726 A1 | 7/2006 | Weston et al. |
| 2006/0252563 A1 | 11/2006 | Werner |
| 2006/0256081 A1 | 11/2006 | Zalewski et al. |
| 2006/0282873 A1 | 12/2006 | Zalewski et al. |
| 2006/0287087 A1 | 12/2006 | Zalewski et al. |
| 2007/0051871 A1 | 3/2007 | Haven |
| 2007/0259594 A1 | 11/2007 | Galbiati et al. |
| 2007/0265075 A1 | 11/2007 | Zalewski |
| 2008/0013826 A1 | 1/2008 | Hillis et al. |
| 2008/0014835 A1 | 1/2008 | Weston et al. |
| 2008/0074652 A1 | 3/2008 | Fouquet et al. |
| 2008/0096654 A1 | 4/2008 | Mondesir et al. |
| 2008/0125896 A1 | 5/2008 | Troy et al. |
| 2008/0244468 A1 | 10/2008 | Nishihara et al. |
| 2009/0051653 A1 | 2/2009 | Barney et al. |
| 2009/0066784 A1 | 3/2009 | Stone et al. |
| 2009/0115721 A1 | 5/2009 | Aull et al. |
| 2009/0121894 A1 | 5/2009 | Wilson et al. |
| 2009/0124165 A1 | 5/2009 | Weston |
| 2009/0191968 A1 | 7/2009 | Johnson et al. |
| 2009/0215534 A1 | 8/2009 | Wilson et al. |
| 2009/0222149 A1 | 9/2009 | Murray et al. |
| 2009/0278915 A1 | 11/2009 | Kramer et al. |
| 2009/0292528 A1* | 11/2009 | Kameyama .......... G08G 1/0962 704/9 |
| 2009/0316952 A1 | 12/2009 | Ferren et al. |
| 2010/0040292 A1 | 2/2010 | Clarkson |
| 2010/0049393 A1 | 2/2010 | Emam et al. |
| 2010/0050133 A1 | 2/2010 | Nishihara et al. |
| 2010/0081970 A1 | 4/2010 | Pan |
| 2010/0134308 A1 | 6/2010 | Barnardo et al. |
| 2010/0192007 A1 | 7/2010 | Tarra et al. |
| 2010/0194762 A1 | 8/2010 | Latta et al. |
| 2010/0199228 A1 | 8/2010 | Latta et al. |
| 2010/0199230 A1 | 8/2010 | Latta et al. |
| 2010/0208129 A1* | 8/2010 | Rindfuss .......... G06K 9/2018 348/370 |
| 2010/0215215 A1 | 8/2010 | Ueshima et al. |
| 2010/0225588 A1 | 9/2010 | Newton et al. |
| 2010/0281436 A1 | 11/2010 | Kipman et al. |
| 2010/0292007 A1 | 11/2010 | Rabin et al. |
| 2010/0304868 A1 | 12/2010 | Zalewski |
| 2010/0306712 A1 | 12/2010 | Snook et al. |
| 2010/0306714 A1 | 12/2010 | Latta et al. |
| 2010/0306715 A1 | 12/2010 | Geisner et al. |
| 2010/0306716 A1 | 12/2010 | Perez |
| 2010/0321149 A1 | 12/2010 | Foster |
| 2010/0327002 A1 | 12/2010 | Hegan et al. |
| 2011/0028227 A1 | 2/2011 | Dubois et al. |
| 2011/0081970 A1 | 4/2011 | Barney et al. |
| 2011/0118021 A1 | 5/2011 | Zalewski et al. |
| 2011/0151974 A1 | 6/2011 | Deaguero |
| 2011/0174189 A1 | 7/2011 | Beutler et al. |
| 2011/0183751 A1 | 7/2011 | Ueshima |
| 2011/0199337 A1* | 8/2011 | Tang .......... G06F 3/0421 345/175 |
| 2011/0312428 A1* | 12/2011 | Nemeth .......... A63G 1/24 472/30 |
| 2011/0316720 A1 | 12/2011 | Ghatak |
| 2012/0133527 A1 | 5/2012 | Lin |
| 2012/0133528 A1 | 5/2012 | Lee et al. |
| 2012/0133529 A1 | 5/2012 | He |
| 2012/0133530 A1 | 5/2012 | Morgan et al. |
| 2012/0133531 A1 | 5/2012 | Cliquennois et al. |
| 2012/0133532 A1 | 5/2012 | Hunt et al. |
| 2012/0133533 A1 | 5/2012 | Berkeman et al. |
| 2012/0133534 A1 | 5/2012 | Oshima |
| 2012/0133535 A1 | 5/2012 | Verbruggen |
| 2012/0133536 A1 | 5/2012 | Lai et al. |
| 2012/0133537 A1 | 5/2012 | Lee et al. |
| 2012/0133538 A1 | 5/2012 | Choi et al. |
| 2012/0133539 A1 | 5/2012 | Hales et al. |
| 2012/0133540 A1 | 5/2012 | Choi et al. |
| 2012/0133541 A1 | 5/2012 | Schmatz et al. |
| 2012/0133542 A1 | 5/2012 | Ben-Shmuel |
| 2012/0133543 A1 | 5/2012 | Al-Khalefah et al. |
| 2012/0133544 A1 | 5/2012 | Rudd et al. |
| 2012/0133545 A1 | 5/2012 | Fagan et al. |
| 2012/0133546 A1 | 5/2012 | Reiter |
| 2012/0133547 A1 | 5/2012 | MacDonald et al. |
| 2012/0133548 A1 | 5/2012 | Schneider |
| 2012/0133549 A1 | 5/2012 | Culkin et al. |
| 2012/0133550 A1 | 5/2012 | Benninghofen et al. |
| 2012/0133551 A1 | 5/2012 | Pujol et al. |
| 2012/0133552 A1 | 5/2012 | Wu |
| 2012/0133553 A1 | 5/2012 | Schmidt-Karaca et al. |
| 2012/0133554 A1 | 5/2012 | Bromley et al. |
| 2012/0133555 A1 | 5/2012 | Hyun |
| 2012/0133556 A1 | 5/2012 | Hsu et al. |
| 2012/0133557 A1 | 5/2012 | Beaudin |
| 2012/0133558 A1 | 5/2012 | Fretenburg et al. |
| 2012/0133559 A1 | 5/2012 | Motta Cruz et al. |
| 2012/0133560 A1 | 5/2012 | Tang |
| 2012/0133561 A1 | 5/2012 | Konanur et al. |
| 2012/0133562 A1 | 5/2012 | Kim et al. |
| 2012/0133563 A1 | 5/2012 | Naka |
| 2012/0133564 A1 | 5/2012 | Sanford |
| 2012/0133565 A1 | 5/2012 | Konanur et al. |
| 2012/0133566 A1 | 5/2012 | Harscher et al. |
| 2012/0133567 A1 | 5/2012 | Harel et al. |
| 2012/0133568 A1 | 5/2012 | Lafleur |
| 2012/0133569 A1 | 5/2012 | Pivit et al. |
| 2012/0133570 A1 | 5/2012 | Maruyama |
| 2012/0133571 A1 | 5/2012 | Collins et al. |
| 2012/0133572 A1 | 5/2012 | Hsu et al. |
| 2012/0133573 A1 | 5/2012 | Yoon |
| 2012/0133574 A1 | 5/2012 | Wu et al. |
| 2012/0133575 A1 | 5/2012 | Hasegawa |
| 2012/0133576 A1 | 5/2012 | Kamada et al. |
| 2012/0133577 A1 | 5/2012 | Gondo |
| 2012/0133578 A1 | 5/2012 | Arabi et al. |
| 2012/0133579 A1 | 5/2012 | Prieur et al. |
| 2012/0133580 A1 | 5/2012 | Kirby et al. |
| 2012/0133581 A1 | 5/2012 | Li et al. |
| 2012/0133582 A1 | 5/2012 | Ohsawa et al. |
| 2012/0133583 A1 | 5/2012 | Ramrattan et al. |
| 2012/0133584 A1 | 5/2012 | Lee et al. |
| 2012/0133585 A1 | 5/2012 | Han et al. |
| 2012/0133586 A1 | 5/2012 | Nishimura et al. |
| 2012/0133587 A1 | 5/2012 | Edwards |
| 2012/0133588 A1 | 5/2012 | Huang et al. |
| 2012/0133589 A1 | 5/2012 | Marsden et al. |
| 2012/0133590 A1 | 5/2012 | Baek |
| 2012/0162436 A1 | 6/2012 | Cordell et al. |
| 2012/0182390 A1* | 7/2012 | Purvis .......... G06K 9/00771 348/46 |
| 2012/0262366 A1 | 10/2012 | Zhu et al. |
| 2012/0287280 A1 | 11/2012 | Essati et al. |
| 2013/0099092 A1* | 4/2013 | Lin .......... G06F 3/0421 250/206.1 |
| 2013/0113890 A1 | 5/2013 | Lee et al. |
| 2013/0177296 A1 | 7/2013 | Geisner et al. |

(56) References Cited

U.S. PATENT DOCUMENTS

| | | |
|---|---|---|
| 2013/0188839 A1 | 7/2013 | Abraham et al. |
| 2013/0194089 A1* | 8/2013 | Estrada .................. G08B 21/22 340/457.1 |
| 2014/0036076 A1 | 2/2014 | Nerayoff et al. |
| 2014/0135137 A1 | 5/2014 | Heaven et al. |
| 2014/0240102 A1 | 8/2014 | Kawash et al. |
| 2014/0309035 A1* | 10/2014 | Crawford .............. A63F 13/803 463/36 |
| 2014/0314278 A1 | 10/2014 | Tatsuzawa et al. |
| 2015/0130934 A1 | 5/2015 | Carey |
| 2015/0232059 A1 | 8/2015 | Zamperla |
| 2015/0336013 A1 | 11/2015 | Stenzler et al. |
| 2015/0336014 A1 | 11/2015 | Stenzler et al. |
| 2015/0336015 A1 | 11/2015 | Blum et al. |
| 2015/0338196 A1 | 11/2015 | Cortelyou et al. |
| 2015/0338548 A1 | 11/2015 | Cortelyou et al. |
| 2015/0339920 A1 | 11/2015 | Cortelyou et al. |

FOREIGN PATENT DOCUMENTS

| | | |
|---|---|---|
| EP | 1578130 | 9/2005 |
| GB | 2352899 A | 2/2001 |
| JP | 1997506194 | 6/1997 |
| JP | 1999211831 A | 6/1999 |
| JP | H11211831 A | 8/1999 |
| JP | 2005082147 A | 3/2005 |
| JP | 2006008110 A | 1/2006 |
| JP | 2007055294 A | 3/2007 |
| JP | 2012120648 | 6/2012 |
| JP | 2012226666 A | 11/2012 |
| JP | 2013175221 A | 9/2013 |
| RU | 84247 U1 | 7/2009 |
| WO | 9515505 | 6/1995 |
| WO | 2006011386 A1 | 2/2006 |

OTHER PUBLICATIONS

Chung, J. et al.; "Vision Based Motion Tracking System for Interactive Entertainment Applications"; ETRI 2005, pp. 1-6.

Hargather, M. et al.; "Retroreflective Shadowgraph Technique for Large-Scale Flow Visualization"; Applied Optics vol. 48(22) 2009, pp. 4449-4457.

Sparacino, F. et al.; "Media in Performance: Interactive Spaces for Dance, Theater, Circus, and Museum Exhibits"; IBM Systems Journal vol. 39 (3&4) 2000, pp. 479-510.

PCT/US2015/032028 International Search Report and Written Opinion dated Sep. 8, 2015.

Ouchi et al., "Magic Wand: An Intuitive Gesture Remote Control for Home Appliances," May 2005.

3M, "Retroreflection," Personal Safety Products, 3M Occupational health and Environmental Safety Division; St. Paul, Minnesota, 2005, www.3M.com/Scotchlite.

Japanese Patent Office, Decision of Grant, dated Aug. 31, 2018.

Search Report for Russian Application No. 2016150097T dated Jul. 12, 2018. 2 Pages.

Extended European Search Report for EP Application No. 18210267.3 dated May 8, 2019.

Japanese Office Action for Japanese Patent Application No. 2019-048769 dated Mar. 16, 2020.

* cited by examiner

AMUSEMENT PARK ELEMENT TRACKING SYSTEM

CROSS REFERENCE TO RELATED APPLICATIONS

This application is a continuation of U.S. patent application Ser. No. 15/464,093, entitled "AMUSEMENT PARK ELEMENT TRACKING SYSTEM," filed Mar. 20, 2017, which is a continuation of U.S. patent application Ser. No. 14/673,643 entitled "AMUSEMENT PARK ELEMENT TRACKING SYSTEM," filed Mar. 30, 2015, now U.S. Pat. No. 9,600,999, which issued on Mar. 21, 2017, which claims priority from and the benefit of U.S. Provisional Application No. 62/001,551, filed May 21, 2014. Each of the foregoing applications is hereby incorporated by reference in its entirety for all purposes.

BACKGROUND

The present disclosure relates generally to the field of tracking systems and, more particularly, to methods and equipment used to enable tracking of elements in a variety of contexts in an amusement park through a dynamic signal to noise ratio tracking system.

Tracking systems have been widely used to track motion, position, orientation, and distance, among other aspects, of objects in a wide variety of contexts. Such existing tracking systems generally include an emitter that emits electromagnetic energy and a detector configured to detect the electromagnetic energy, sometimes after it has been reflected off an object. It is now recognized that traditional tracking systems have certain disadvantages and that improved tracking systems are desired for use in a variety of contexts, including amusement park attractions, workplace monitoring, sports, fireworks displays, factory floor management, robotics, security systems, parking, and transportation, among others.

BRIEF DESCRIPTION

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes one or more retro-reflective markers positioned within a ride system and a tracking system that may detect the one or more retro-reflective markers to track a position of a rider. The tracking system includes an emitter that may emit light toward the one or more retro-reflective markers, a detector that may detect reflected light from the one or more retro-reflective markers, and a controller that may determine the position of the rider relative to the one or more retro-reflective markers based on detection of the reflected light and that may provide an indication of the position of the rider.

In accordance with a second embodiment, a method includes emitting electromagnetic radiation from an emitter toward one or more retro-reflective markers disposed in a detection region of an amusement park ride. The emitter is a part of a tracking system that may track the one or more retro-reflective markers. The method also includes reflecting the electromagnetic radiation from the one or more retro-reflective markers, detecting the reflected electromagnetic radiation with a detector of the tracking system, determining a position of a rider or a ride element based on the reflected electromagnetic radiation using a controller communicatively coupled to the tracking system.

In accordance with a third embodiment, a system includes a controller including one or more tangible, non-transitory, machine-readable media collectively storing one or more sets of instructions and one or more processing devices that may execute the one or more sets of instructions to activate an emitter. The emitter emits electromagnetic radiation towards retro-reflective markers disposed on an amusement park ride. The one or more processing devices may also execute the one or more sets of instructions to receive detected electromagnetic radiation reflected from all or a portion of the retro-reflective markers via a detector, determine a position of a rider or a ride element relative to the retro-reflective markers based on the detected electromagnetic radiation, and actuate a device in response to the position of the rider or ride element. The device may adjust an operational parameter of the amusement park ride.

DRAWINGS

These and other features, aspects, and advantages of the present disclosure will become better understood when the following detailed description is read with reference to the accompanying drawings in which like characters represent like parts throughout the drawings, wherein.

Figure 1:
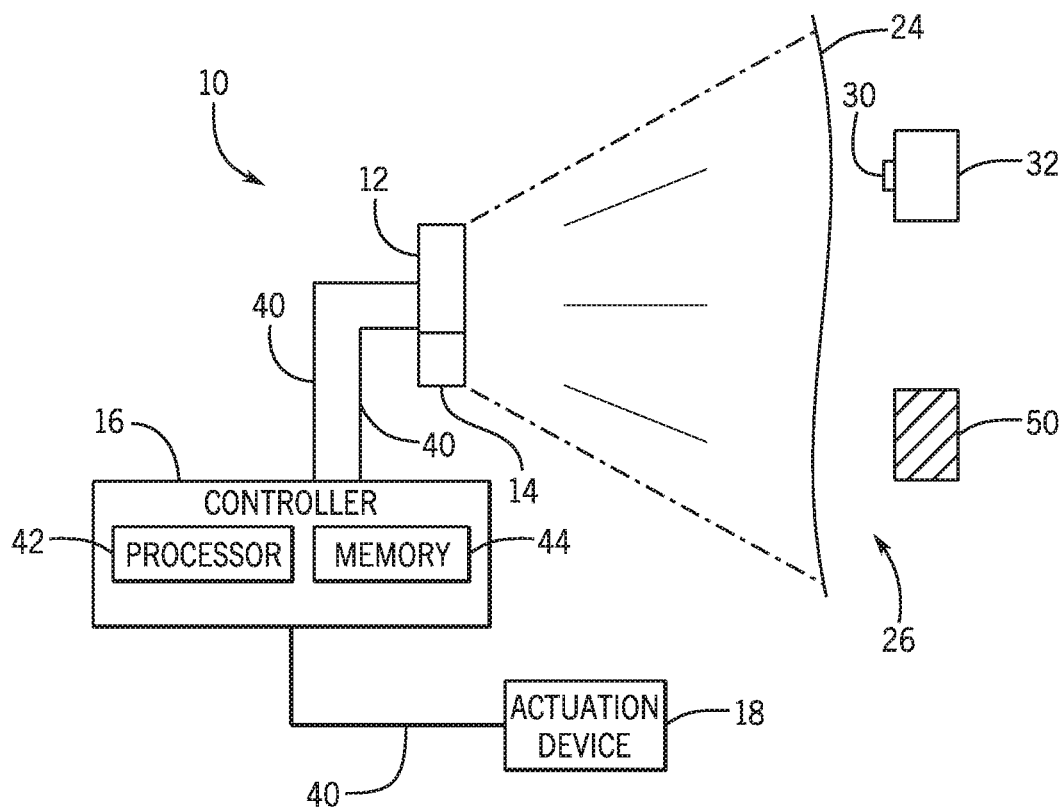
FIG. 1 is a schematic representation of a tracking system utilizing a dynamic signal to noise ratio device to track objects, in accordance with an embodiment of the present disclosure.
Figure 4:
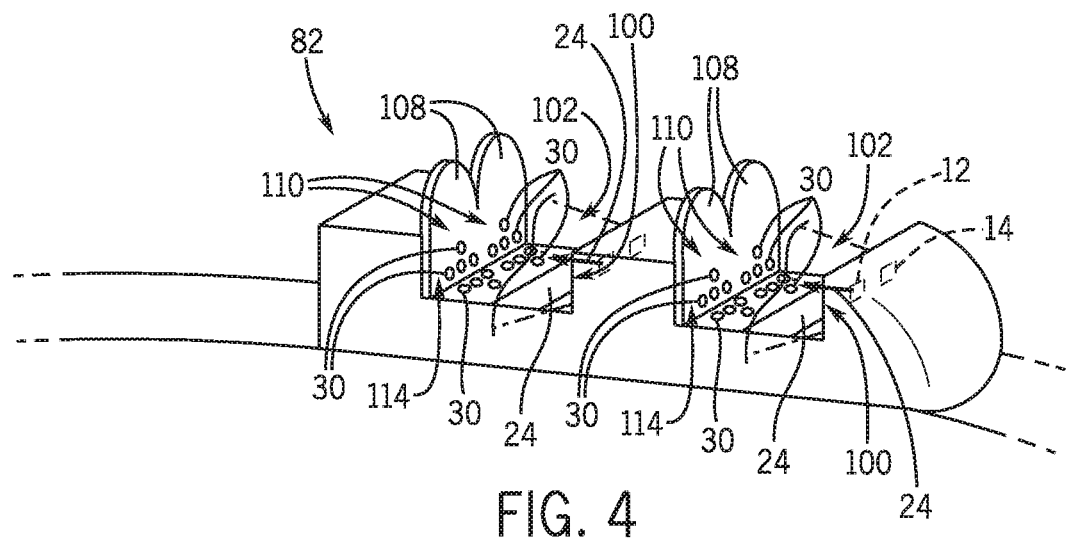
FIG. 4 is a schematic perspective view of a ride vehicle for an amusement park with the tracking system of FIG. 1 for detecting whether a seat is occupied, in accordance with an embodiment of the present disclosure.
Figure 5:
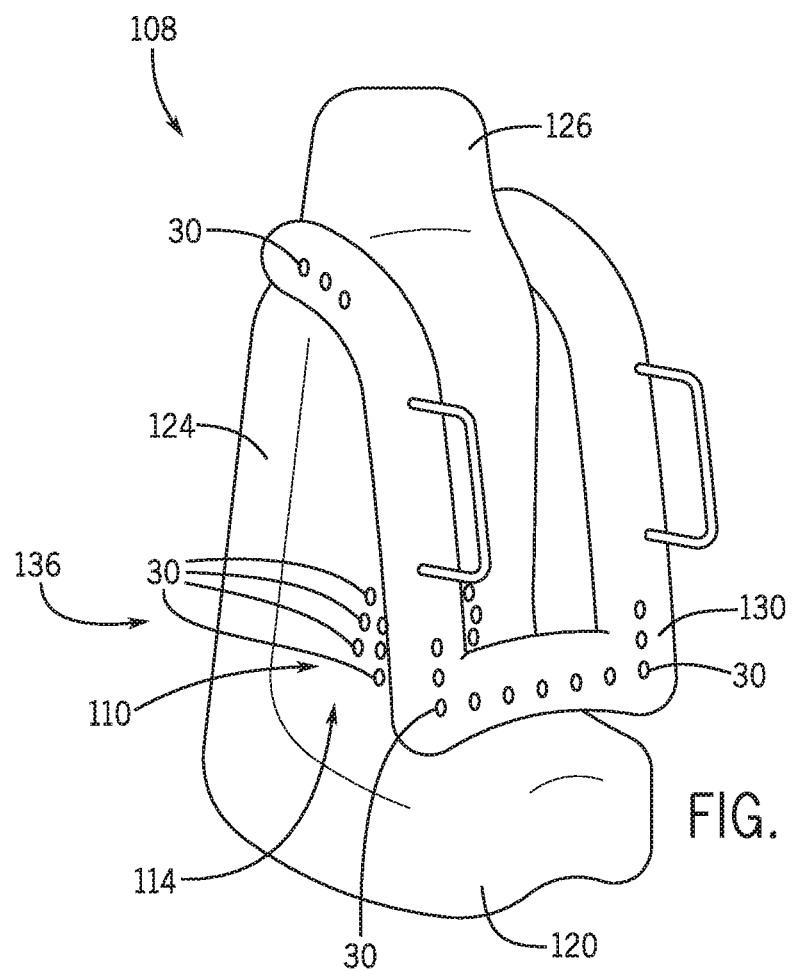
FIG. 5 is a schematic perspective view of a seat for an amusement park attraction, the seat having retro-reflective markers for use with the tracking system of FIG. 1 to track a position of a rider or seat feature, in accordance with an embodiment of the present disclosure.
Figure 10:
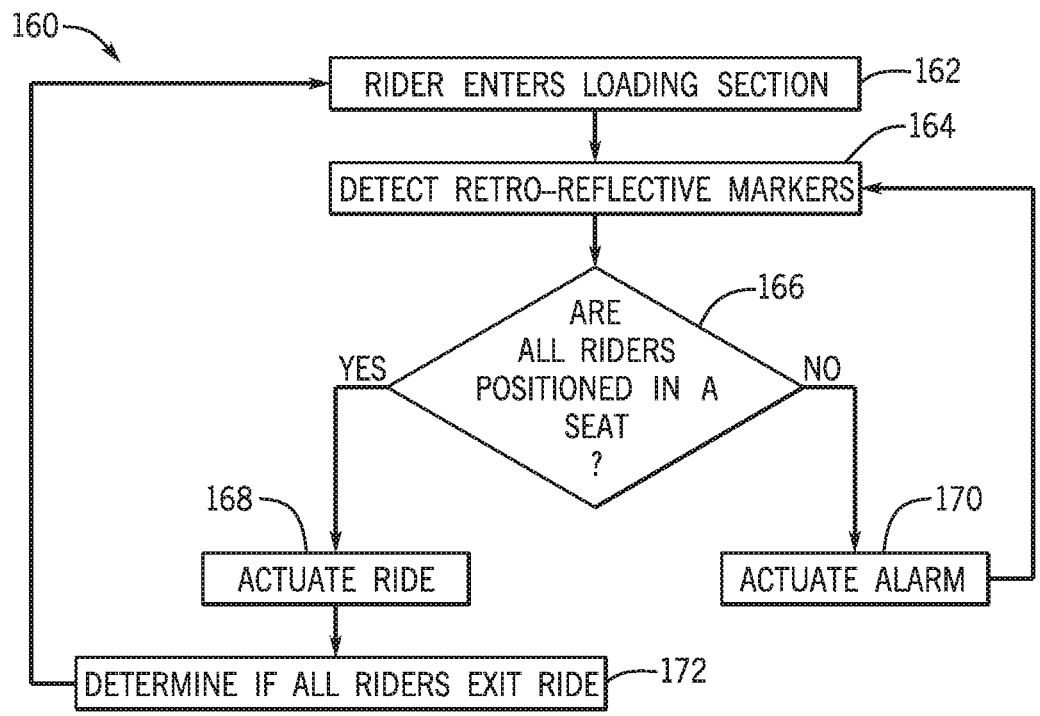
Figure 11:
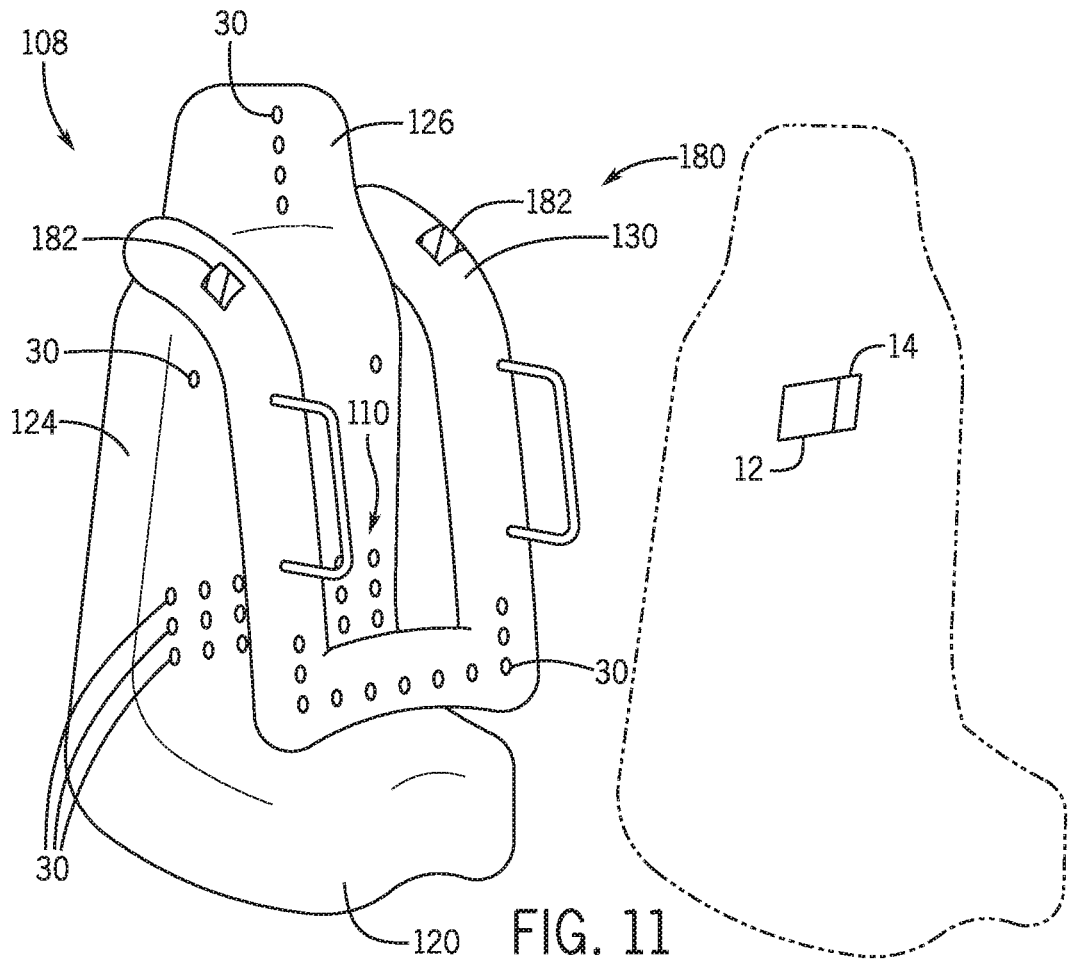
Figure 12:
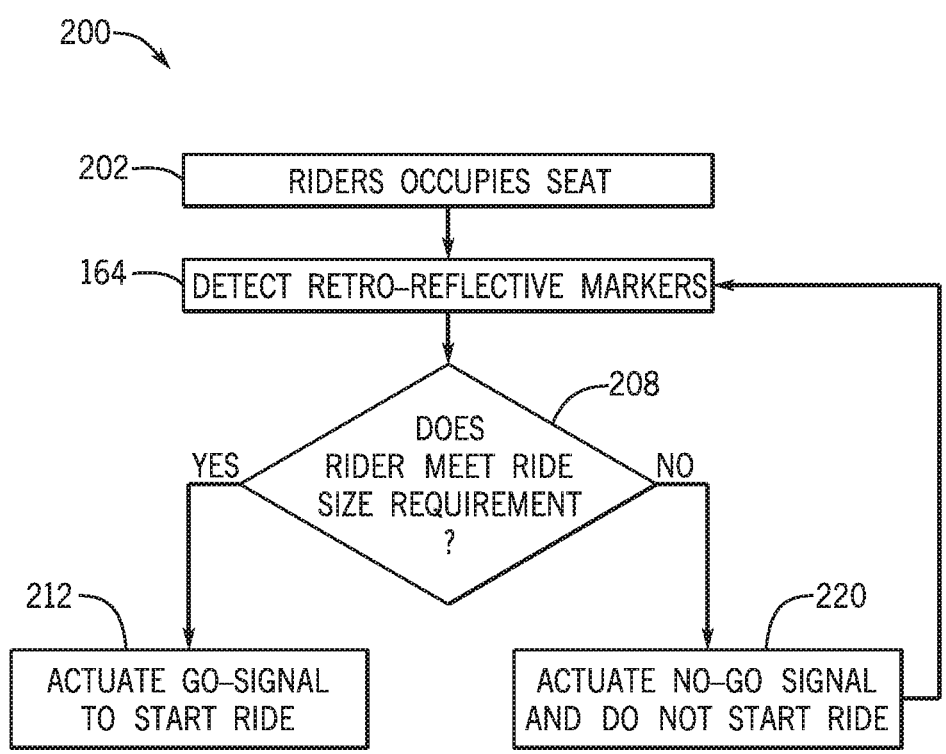
Figure 13:
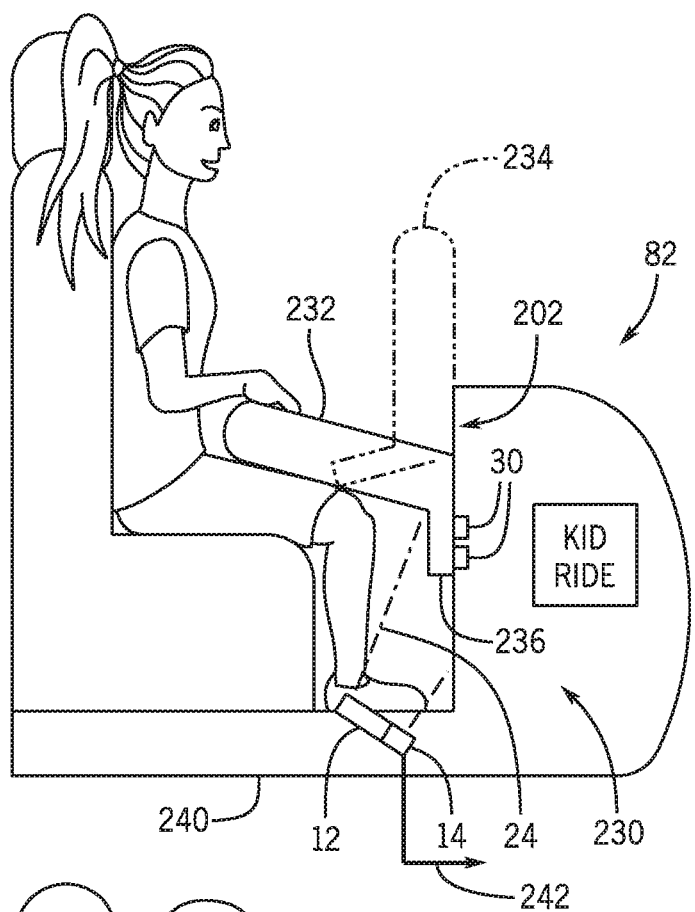
Figure 14:
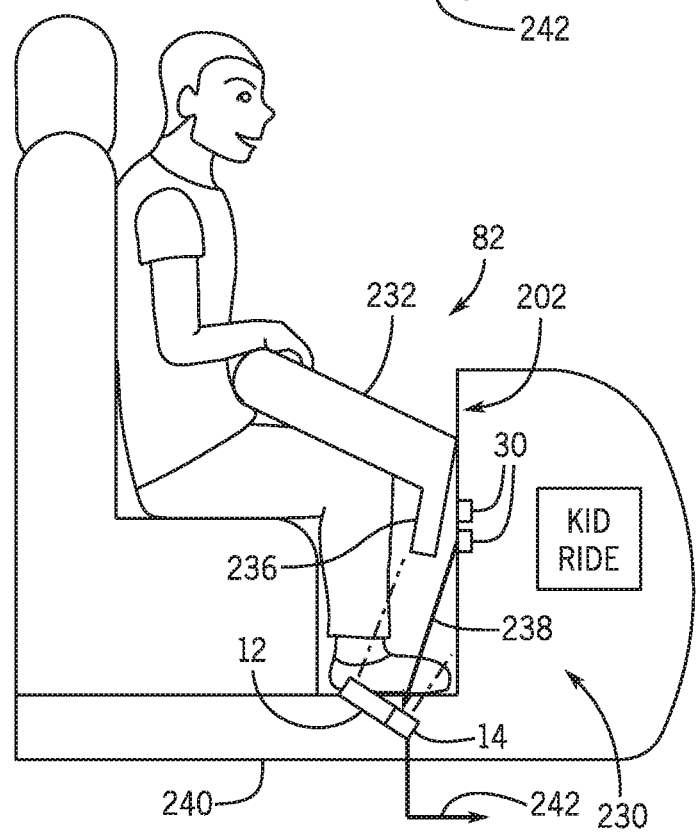
Figure 15:
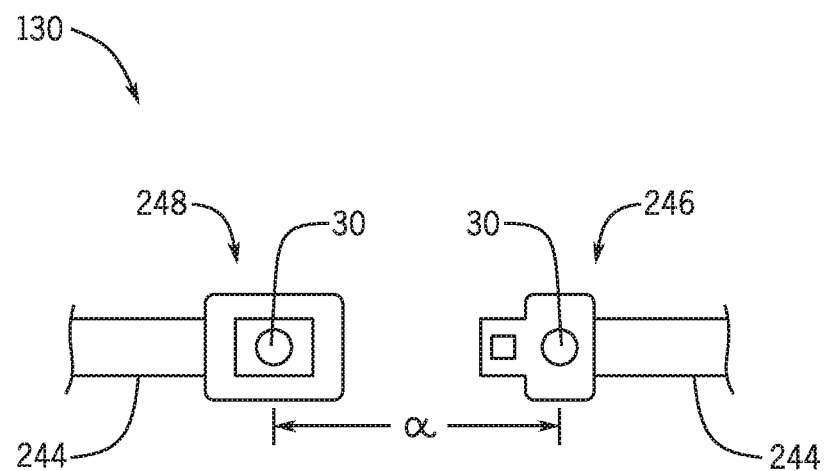
Figure 16:
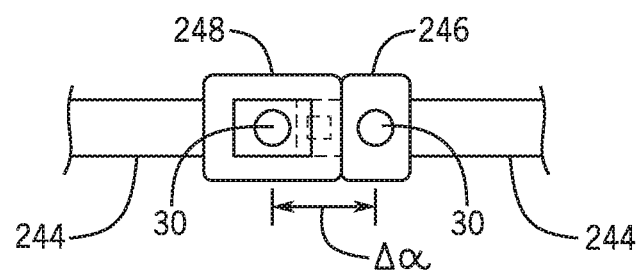
Figure 17:
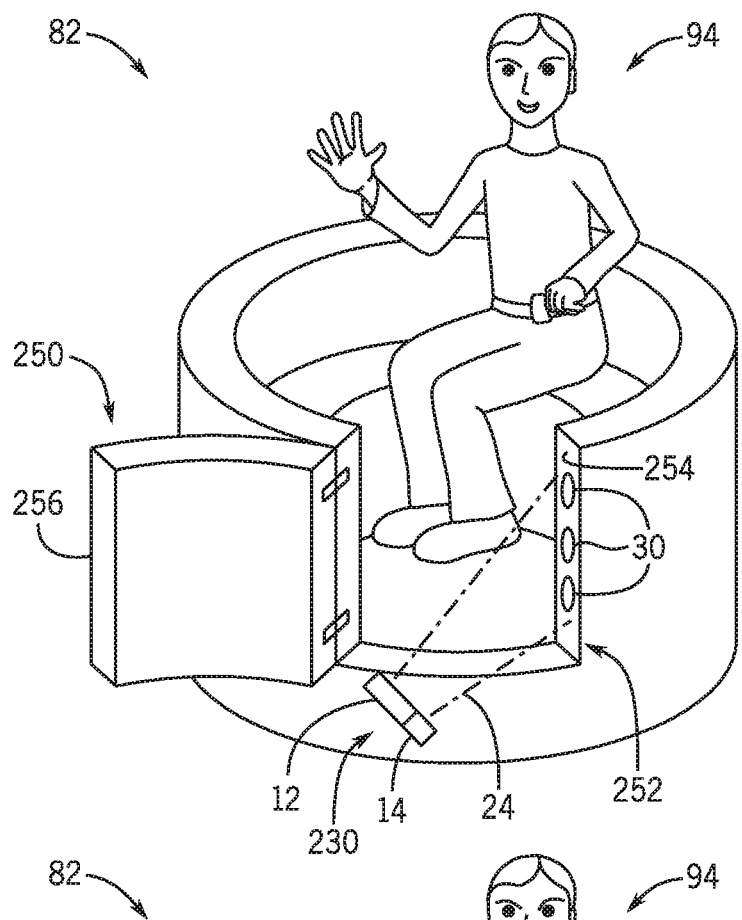
Figure 18:
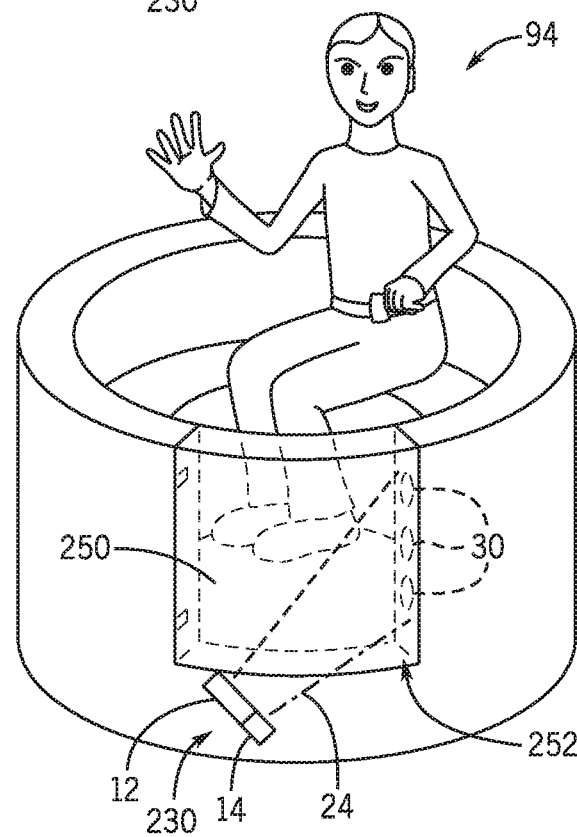
Figure 19:
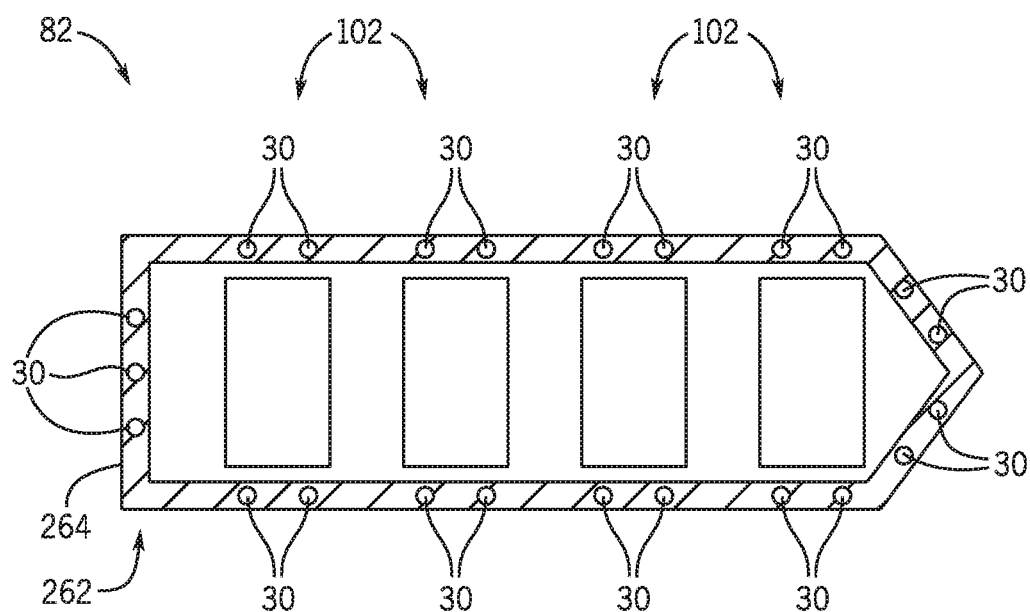
Figure 20:
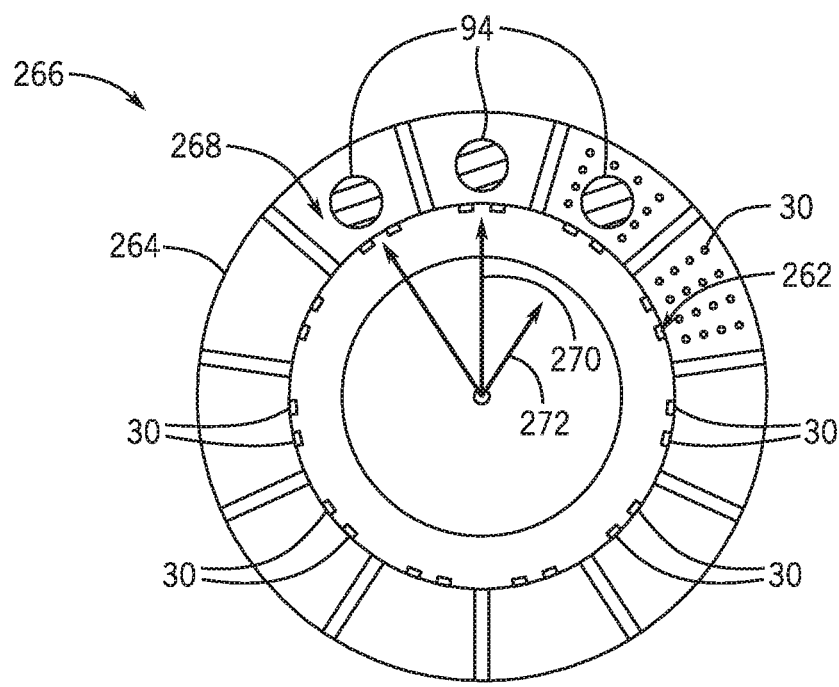
Figure 21:
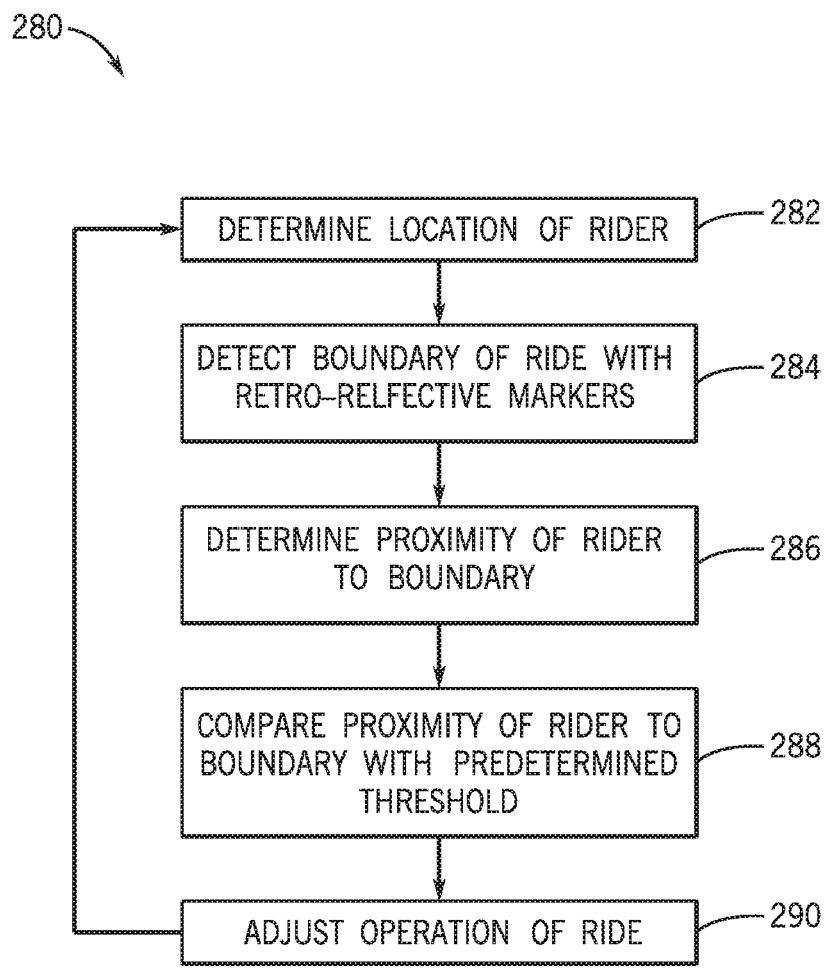
Figure 22:
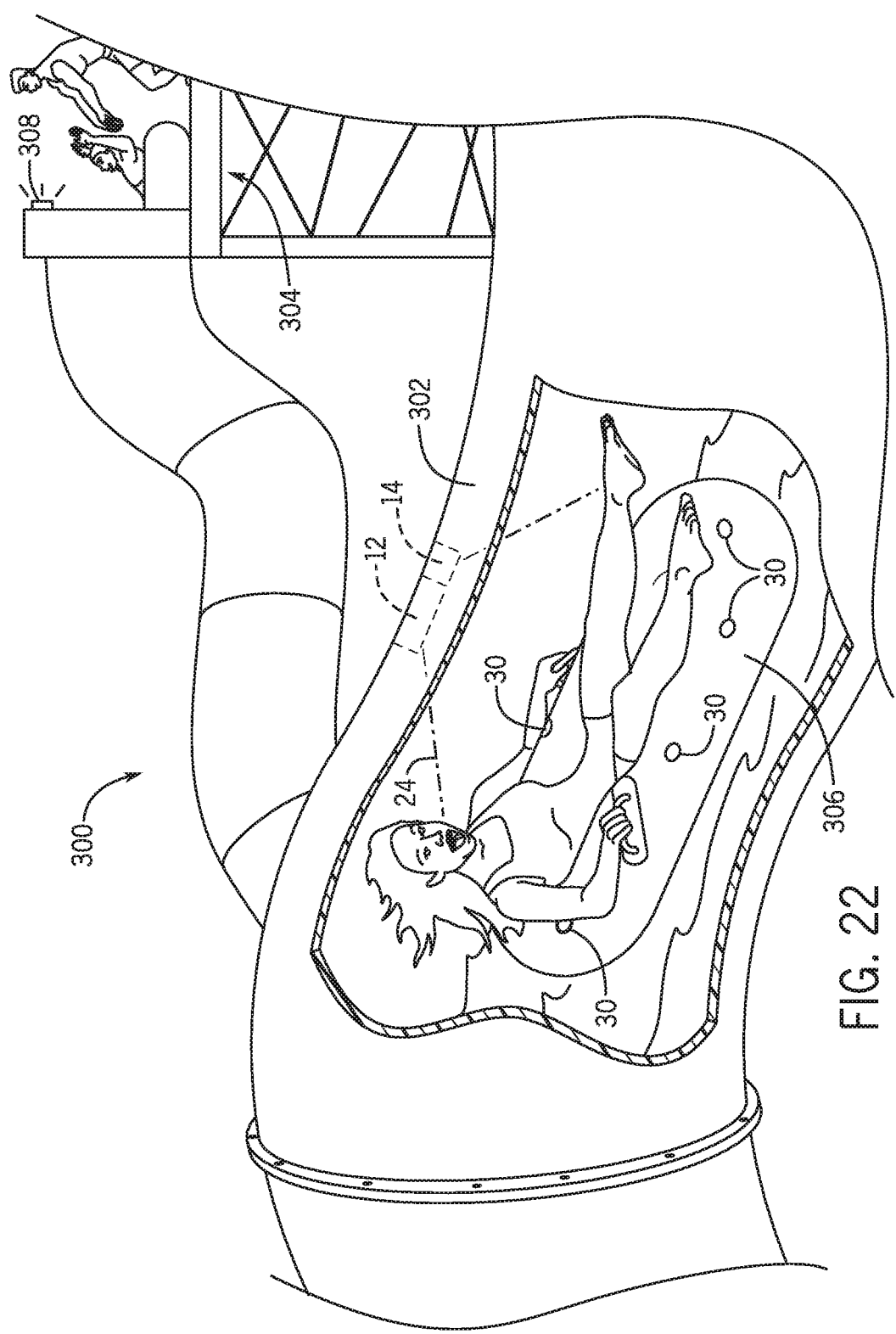

1 to track a position of the rider, in accordance with an embodiment of the present disclosure;

FIG. 10 is a process flow diagram of a method for determining a status of the seat via feedback from the tracking system, in accordance with an embodiment of the present disclosure;

FIG. 11 is a schematic perspective view of an embodiment of the seat of FIG. 5 having retro-reflective markers for use with the tracking system of FIG. 1 to evaluate rider size, in accordance with an embodiment of the present disclosure;

FIG. 12 is a process flow diagram of a method for determining a rider size via feedback from the tracking system, in accordance with an embodiment of the present disclosure;

FIG. 13 is a side schematic representation of a child sitting in a ride vehicle that utilizes the tracking system of FIG. 1 to confirm that the seat restraint is locked, in accordance with an embodiment of the present disclosure;

FIG. 14 is a side schematic representation of an adult sitting in the ride vehicle that utilizes the tracking system of FIG. 1 to determine that the seat restraint is not locked, in accordance with an embodiment of the present disclosure;

FIG. 15 is a schematic perspective view of a ride restraint system having uncoupled connectors, the connectors having retro-reflective markers that reflect light at different wavelengths, in accordance with an embodiment of the present disclosure;

FIG. 16 is a schematic perspective view of the ride restraint system of FIG. 15 having coupled connectors, in accordance with an embodiment of the present disclosure;

FIG. 17 is a schematic perspective view of a ride vehicle with the tracking system of FIG. 1 used to detect that a ride door is not closed, in accordance with an embodiment of the present disclosure;

FIG. 18 is a schematic perspective view of the ride vehicle of FIG. 13 with the tracking system used to confirm that the ride door is closed, in accordance with an embodiment of the present disclosure;

FIG. 19 is a schematic overhead view of the ride vehicle of FIG. 4, the ride vehicle having retro-reflective markers for use with the tracking system of FIG. 1 to determine a boundary region;

FIG. 20 is a schematic overhead view of a centrifugal amusement park ride having retro-reflective markers for use with the tracking system of FIG. 1 to determine a boundary region;

FIG. 21 is a process flow diagram of a method for controlling operation of an amusement park ride via feedback from the tracking system, in accordance with an embodiment of the present disclosure; and FIG. 22 is a schematic perspective view of a water park attraction utilizing the tracking system of FIG. 1 to detect people using a device of the water park attraction, in accordance with an embodiment of the present disclosure.

DETAILED DESCRIPTION

Amusement parks include many rides that attract and entertain a large crowd of people. It is now recognized that it may be advantageous to include a tracking system on the rides to facilitate tracking and monitoring positions of people (e.g., riders), ride elements (e.g., ride restraints, ride boundaries, ride seat, ride vehicle, etc.), and objects before, during, and after operation of the ride. Tracking and monitoring riders on the ride may allow an operator of the ride to determine whether the ride is ready to be released from a loading section and/or ensure that the rider is following proper ride procedures. As one example, the tracking system may be used to track a number of riders that enter and exit the ride before and after each ride cycle (from ride start to ride finish). Additionally, the tracking system may be used to determine a status of a ride seat (e.g., occupied or unoccupied), evaluate a position of the rider and/or a position of a rider restraint (e.g., cross bar, harness, seat belt) relative to the ride seat, ride boundaries, and/or objects (e.g., backpack, hat, wallet). Accordingly, the tracking system may facilitate a flow of riders in and out of the ride in a reasonable amount of time, and thereby reduce ride wait times.

In certain embodiments, the tracking system is designed to detect a relative positioning of an illuminated component (disposed on the ride, rider, or object) having a properly correlated retro-reflective material. The tracking system may utilize the relative positioning to monitor a position or existence of the rider and/or specific objects (e.g., the restraint, the ride seat, backpack, hat, wallet) or the ride within a field of view of the tracking system, and to activate an alarm or control operation of the ride. In one embodiment, if a proper correlation is found, the tracking system may provide an output to a computer, display, or monitoring device.

FIG. 1 is a schematic view of a dynamic signal to noise ratio tracking system 10 (hereinafter referred to as "tracking system 10") in accordance with present embodiments. The tracking system 10 is designed to detect relative positioning of an illuminated component having a properly correlated retro-reflective material. As illustrated, the tracking system 10 includes an emitter 12, a sensing device 14, a controller 16, and an actuatable device 18 (e.g., a ride activation switch). The emitter 12 operates to emit electromagnetic radiation, which is represented by an expanding light beam 24 for illustrative purposes, to selectively illuminate, bathe or flood a detection area 26 in the electromagnetic radiation. The light beam 24 may be representative of multiple light beams being emitted from different sources. Further, in some embodiments the light beam 24 is emitted at a frequency that has a correspondence to a material defining a retro-reflective marker 30 on an object 32 located within the detection area. Indeed, in the illustrated embodiment, the object 32 represents a component of a ride seat and the retro-reflective marker 30 represents a pattern of such marker. In certain embodiments, the retro-reflective marker 30 may be disposed on the ride (e.g., the ride seat). In other embodiments, the retro-reflective marker 30 may form part of a necklace, wristband, or button wearable by amusement park guests.

The retro-reflective marker 30 may include a coating of retro-reflective material disposed on a body of the object 32, or a solid piece of retro-reflective material coupled with the body of the object 32. The retro-reflective marker 30 may coordinate with the light beam 24 to reflect electromagnetic radiation back toward the sensing device 14 to facilitate identification of a location of the retro-reflective marker 30 by the system 10. This location information (obtained using the reflected electromagnetic radiation) may then be utilized by the controller 16 to determine whether the actuatable device 18 or a component of the actuatable device 18 should be actuated. In some embodiments, the light beam 24 represents a limited number of light beams or light emissions (provided in series or simultaneously) that are used to identify the position of the object 32, which may be facilitated by the retro-reflective marker 30. Indeed, the retro-reflective marker 30 may operate or be designed to always or essentially always return radiation (e.g., light) to its source.

Specifically, in operation, the sensing device 14 of the system 10 may function to detect the light beam 24 bouncing off of the retro-reflective marker 30 and provide data associated with the detection to the controller 16 via connections 40 (e.g., wired or wireless communication features) for processing. The sensing device 14 may operate to specifically identify the marker 30 based on specific wavelengths of light emitted and reflected and, thus, avoid issues with false detections. In this regard, different types of retro-reflective markers 30 (e.g., having different colors) may also be distinguished from one another by the system 10. Also, such detection of the retro-reflective markers 30 may also facilitate pattern detection and disruption, as discussed in further detail below. Once the controller 16 receives the data from the sensing device 14, the controller 16 may utilize a processor 42 and/or a memory 44 to determine a location of the retro-reflective marker 30. Indeed, the controller 16 may employ known visual boundaries or an established orientation of the sensing device 14 (e.g., a priori information) to identify a location (e.g., coordinates) corresponding to the detected retro-reflective marker 30. These acts may be carried out, for example, using one or more processing devices of the processor 42 in combination with the memory 44, which may include one or more tangible, non-transitory, machine-readable media collectively storing instructions executable by the processor 42.

The controller 16 may determine a change in reflected light intensity from the retro-reflective marker 30 or a change in a pattern of multiple retro-reflective markers 30. The memory 44 may store threshold values corresponding to a reflected light intensity profile or pattern associated with a status. For example, in certain embodiments, the retro-reflective marker 30 or a pattern of markers 30 may be partially or completely blocked. As such, the controller 16 may determine that an object or rider is positioned over the retro-reflective marker 30. In this way, the tracking system 10 may track the position of the object or rider based on attenuation of the reflected light or changes in a detected pattern.

In accordance with certain embodiments of the present disclosure, the system 10 (e.g., using its associated components) may perform tracking of the riders 94 and/or ride elements (e.g., their positions and positions relative to other ride features) based on the recognition of patterns, and the disruption of patterns formed by a plurality of the retro-reflective markers 30. For example, in a first ride configuration, the retro-reflective markers 30 may be present in a first pattern, which is recognized and monitored by the system 10. If the first ride configuration were associated with, for example, a vacant seat, then the system 10 may associate the first pattern with a vacant ride seat. However, if the first ride configuration were to change, then the change may result in a second pattern of the retro-reflective markers 30. In accordance with an embodiment, the system 10 is configured to detect the second pattern of the retro-reflective markers 30, associate the second pattern with the change, and perform certain actions (e.g., produce warnings, activate various ride mechanisms) as a result of this detection and association. For example, the first configuration may have been changed by a passenger sitting in the ride seat, resulting in all or a portion of the first pattern of the retro-reflective markers 30 being covered to produce the second pattern. In this example, the system 10 might associate the second pattern with an occupied ride seat. As described in further detail below, more sophisticated associations may be performed based on the type and degree of change in patterns of the retro-reflective markers 30. For example, if less than a threshold amount of the first pattern of the retro-reflective markers 30 is covered, then the system 10 might indicate that the occupant of the ride seat is too small for the ride, and not allow the ride to start until the ride seat is vacant or occupied by a person large enough to cover an appropriate amount of the first pattern (e.g., to produce an appropriate second pattern). These and other embodiments are described in further detail below.

In addition to or in lieu of tracking one or more of the retro-reflective markers 30, the tracking system 10 may be configured to detect and track various other objects located within the detection area 26. For example, the sensing device 14 of the system 10 may function to detect the light beam 24 bouncing off of an object 50 (without retro-reflective markers 30) and provide data associated with this detection to the controller 16. That is, the sensing device 14 may detect the object 50 based entirely on the reflection of electromagnetic energy off the object 50. In some embodiments, the object 50 may be coated with a particular coating that reflects the light beam 24 in a detectable and predetermined manner. Once the controller 16 receives the data from the sensing device 14, the controller 16 may determine a location of the object 50. The controller 16 may be configured to identify certain objects that are expected to cross the path of the light beam 24 within the detection area 26, including those objects 50 that are not marked with retro-reflective material. Such objects 50 may include, among other things, rides, ride restraints, people (e.g., riders), and rider's personal belongings (e.g., backpack, hat, wallet).

As may be appreciated based on the disclosure above, present embodiments of the tracking system 10 may be configured to detect positions of multiple objects 50 and/or retro-reflective markers 30. That is, instead of being positioned and calibrated to determine the presence or position of only a single object (e.g., a single tracked object, a single detected object, a single object associated with a plurality of retro-reflective markers 30) in its field of view, the tracking system 10 is configured to detect and track multiple objects and/or markers located within the same detection area 26 (e.g., multiple patterns of retro-reflective markers 30, relative positions of different colors or shapes of retro-reflective markers 30). To that end, the emitter 12 is configured to flood the detection area 26 with electromagnetic radiation (e.g., via the light beam 24), and the detector 14 is configured to detect the reflected radiation that bounces back from one or more of the objects 50 and/or retro-reflective markers 30 in the detection area 26. Thus, fewer tracking systems 10 may be utilized to detect objects and/or multiple markers (e.g., multiple patterns of markers) within a given area.

Figure 2:
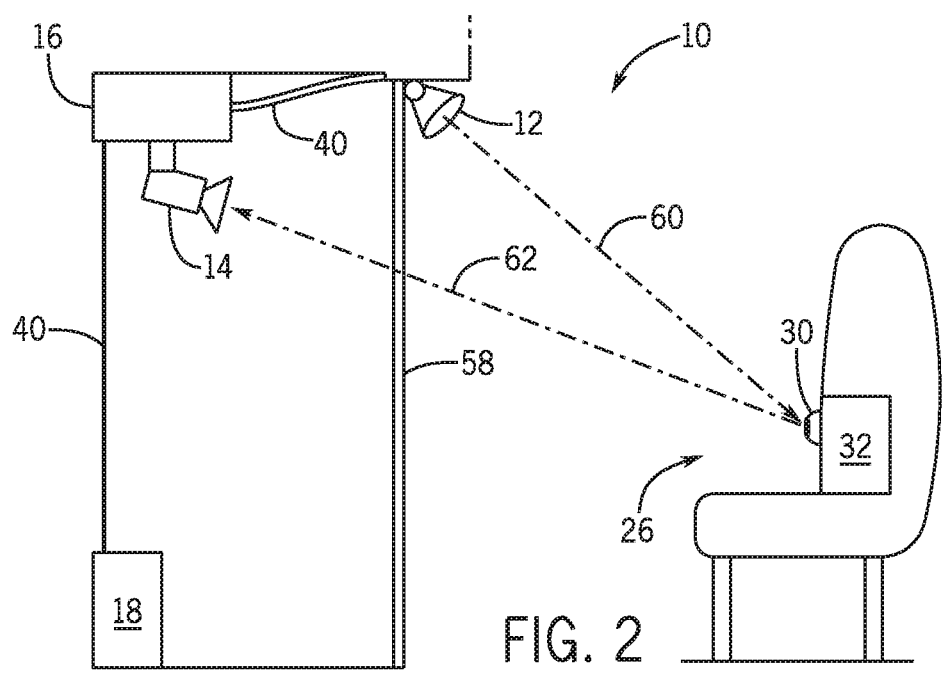
FIG. 2 is a schematic representation of another tracking system utilizing a dynamic signal to noise ratio device to track objects, in accordance with an embodiment of the present disclosure.

As discussed above, the retro-reflective markers 30 may represent a pattern of retro-reflective markers that reflect light from the emitter 12 and are detected by the detector 14 of the tracking system 10. In the embodiment illustrated by FIG. 1, the emitter 12 and the sensor or sensing device 14 are positioned adjacent to one another. In some embodiments, the emitter 12 and the sensing device 14 may have a concentric arrangement. For example, the emitter 12 may be surrounded by multiple sensing devices 14 or the sensing device may be surrounded by multiple emitters 14. In other embodiments, the sensing device 14 (e.g., an infrared camera) may be positioned in a different location with respect to the emitter 12, which may include an infrared light bulb. For example, as illustrated in FIG. 2, the emitter 12 and the sensing device 14 are separate and positioned in different locations. Specifically, the emitter 12 of FIG. 2 is positioned outside of an entrance 58 (e.g., a glass door) of an indoor amusement park attraction containing other components of the system 10. The sensing device 14 of FIG. 2 is positioned away from the emitter 12 but still oriented to detect light reflected from the retro-reflective marker 30 and originating from the emitter 12. For illustrative purposes, arrows 60 and 62 represent a light beam being emitted from the emitter into the detection area 26, reflected by the retro-reflective marker 30 on the object 32, and detected by the sensing device 14. The light beam represented by the arrow 60 is merely one of numerous light beams that flood or otherwise selectively illuminate the detection area 26 from the emitter 12. It should be noted that still other embodiments may utilize different arrangements of components of the system 10 and implementations in different environments in accordance with the present disclosure.

Having now discussed the general operation of the tracking system 10 to detect a position of retro-reflective markers 30 and/or objects 50, as illustrated in FIGS. 1 and 2, certain embodiments of the tracking system 10 will be described in detail. For example, it may be desirable to track the locations of people or objects within the detection area 26 associated with the ride (e.g., a ride vehicle and/or a ride loading and unloading areas) through the use of the disclosed tracking systems. This may be useful, for example, for identifying occupied ride vehicles, rider and/or restraint position with respect to the rider seat, and how many riders entered and exited the ride at each ride cycle, among others. The presently disclosed tracking system 10 may be configured to identify and/or track the position and movement of the riders, objects belonging to the riders, portions of ride vehicles, or any combinations thereof, within the detection area 26, for example by associating the riders and/or objects with one or more retro-reflective markers 30. The tracking system 10 may accomplish this tracking in several different ways, which are described in detail below. It should be noted that the tracking system 10 may detect a position of one or more riders at a time in the same detection area 26 using one or more of the emitter 12, sensing device 14, and controller 16.

Figure 3:
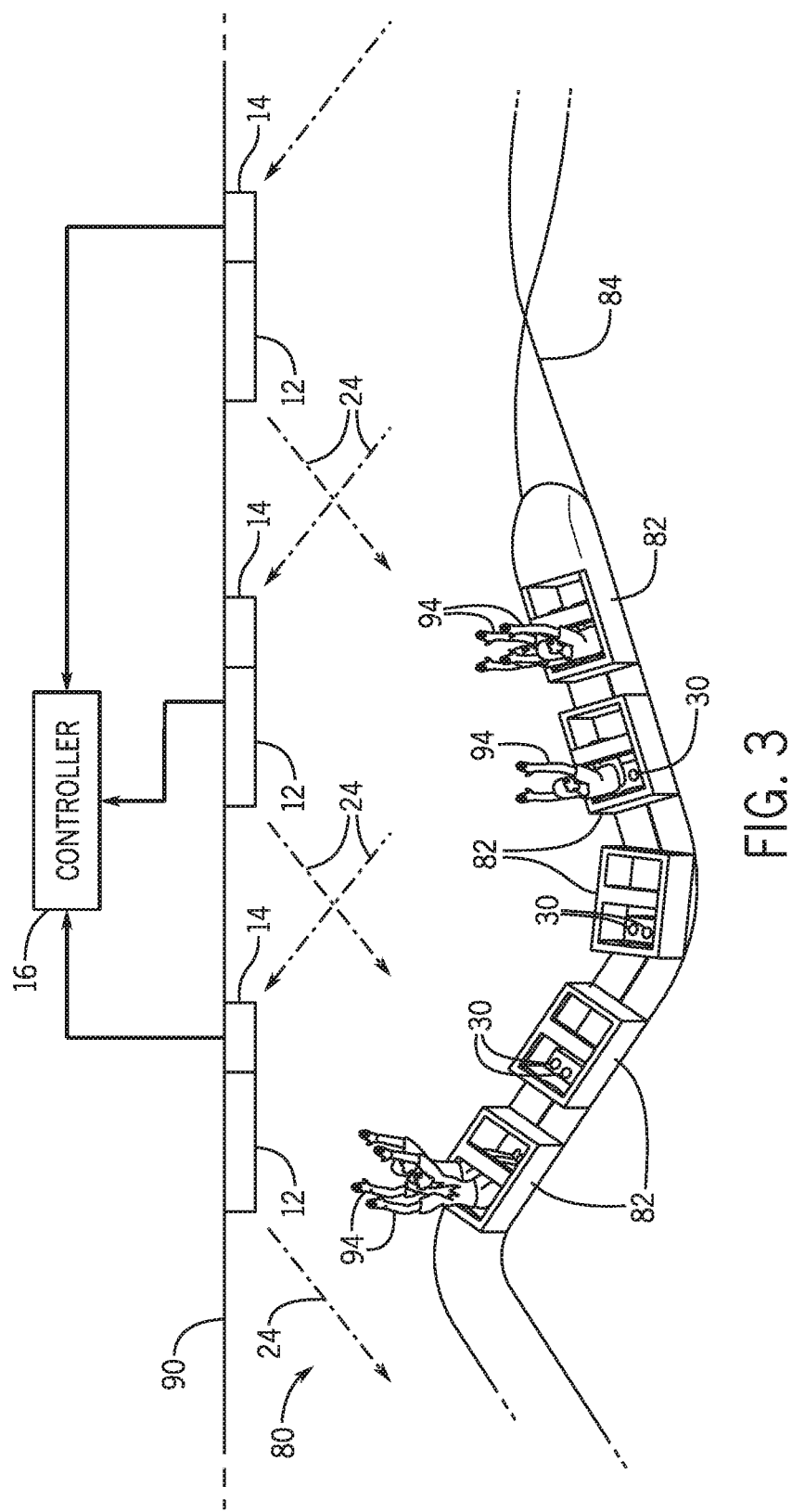
FIG. 3 is a schematic representation of an amusement park ride vehicle having retro-reflective markers and traveling through an enclosed area having the tracking system of FIG. 1, in accordance with an embodiment of the present disclosure.

FIG. 3 illustrates an embodiment of an amusement park ride that may utilize the tracking system 10 in accordance with the present disclosure. In particular, FIG. 3 illustrates an embodiment of an indoor amusement park attraction 80 (herein after referred to as "ride 80") with multiple ride vehicles 82 traveling along a ride path 84 (e.g., a track). In the illustrated embodiment, the emitters 12 and sensing devices 14 of the tracking system 10 are positioned on a ceiling 90 of the ride 80. In other embodiments, however, the emitters 12 and sensing devices 14 may be positioned along other stationary components of the ride 80 facing toward the ride path 84. The ride vehicles 82 may include retro-reflective markers 30 on the portions of the ride vehicles 82 where the riders are supposed to sit. Although shown as one retro-reflective marker 30 per seat position, in other embodiments there may be an array of retro-reflective markers 30 corresponding to each individual seat. For example, the array may form a first pattern of markers identified by the controller 16. When a rider 94 is present in a particular seat of the ride vehicle 82, the tracking system 10 may detect a change in the array, for example a change of the first pattern resulting from blockage of certain retro-reflective markers 30 (e.g., thereby forming a second pattern), as discussed below with reference to FIG. 4. The tracking system 10 may also detect a decrease in reflected light intensity from the retro-reflective markers 30. For example, in certain embodiments, such as if all of the retro-reflective markers 30 are blocked, the tracking system 10 may not detect reflected light from the corresponding retro-reflective marker 30 or a subset or array of markers 30. Accordingly, the controller 16 may indicate to an operator of the amusement attraction 80 that the particular ride seat is occupied or may perform some control action, such as enabling the ride to begin. Similarly, the retro-reflective markers 30 may be disposed along the track 84 to enable the controller 16 to determine that the ride vehicle 82 is positioned over the corresponding portion of the track 84.

In other embodiments, the tracking system 10 may detect changes in pattern of the retro-reflective markers 30 in a seat during operation to perform additional monitoring and control. For example, during operation of the amusement attraction 80, the rider 94 may shift within the ride seat. As a result, a portion of the patterns of the retro-reflective marker 30 may be exposed at any given time during the duration of the ride. Therefore, in addition to monitoring the ridership of the ride 80 before the start of the ride, the controller 16 may monitor the changing of the pattern of retro-reflective markers 30 associated with a particular ride seat to determine a degree of rider shifting within an occupied seat. As described in further detail below, the controller 16 may monitor this degree and may perform certain control actions based on the monitoring. For instance, the controller 16 may generate an alert for a ride operator that the rider is not properly seated, or is not adhering to appropriate ride protocols. Additionally or alternatively, the controller 16 may cause the ride to slow or stop altogether. If these determinations are performed before the ride has begun, the controller 16 may prevent the ride 80 from initiating until a technician provides an "all-clear" or similar indication that the monitored activity does not present a problem. Further, if a particular ride seat is fitted with a large retro-reflective marker 30, the controller 30 may monitor the change in reflected light intensity (e.g., signal attenuation) to make similar determinations and perform similar control actions. For example, the controller 16 may determine whether a seat is occupied and whether the occupant is shifting beyond a degree that is appropriate. Further still, the degree of attenuation of the reflected light may correspond to a pattern of blocked and unblocked retro-reflective makers 30 indicative of an occupied seat. That is, in one embodiment, rather than monitoring distinct patterns, the controller 16 may monitor signal intensity and/or signal attenuation from one or more of the retro-reflective markers 30.

As an example, when the ride seats of ride vehicles 82 are empty, the one or more retro-reflective markers 30 will be uncovered and able to reflect the light beam 24 back to the sensing device 14 for detection via the tracking system 10. In this context, the tracking system 10 may be used to determine and keep an accurate count of the number of riders 94 present on the particular ride 80 (e.g., based on the number of occupied seats). This may provide a more accurate count of the number of riders 94 that actually participate in the ride 80 than would be available through a person merely counting the people as they enter a ride loading area. In accordance with the determination of the ridership of particular attractions, the controller 16 of the tracking system 10 may maintain a log of the number of riders 94 in each ride vehicle 82, or on all of the ride vehicles 82 during a single pass (e.g., ride cycle) of the ride 80, over the course of hours, days, weeks, months, or years. This ridership information may be accessible and used to generate reports and predictions relating to the popularity of the ride 80.

As set forth above, in addition to determining ridership, the illustrated tracking system 10 may be used to evaluate whether the riders 94 remain in their seats for the duration of the ride 80. To enable substantially continuous monitoring of the ride 80 during operation, the illustrated tracking system 10 includes multiple emitters 12 and sensing devices 14 disposed along the ceiling 90 and along a path of the ride 80 (e.g., generally along the track 84). These multiple emitters 12 and sensing devices 14 may provide redundancy while monitoring the number and/or activity of riders 94 present on the ride vehicles 82. Some detectors 14 may be better positioned to detect light reflected from certain seats of the ride vehicles 82 than others. In some embodiments, the multiple emitters 12 and sensing devices 14 may be disposed at different angles throughout the ride 80 to provide a redundant and, therefore, more accurate count and/or positions of the riders 94 currently on the ride 80. The multiple sets of emitters 12 and sensing devices 14 may be communicatively coupled to the same controller 16 (or a control network) for comparing the results from the different sensing devices 14 and determining an accurate number of riders 94. It should be noted that some embodiments may utilize a single detector 14 positioned to observe an entire area.

While redundancy in the emitters 12 and sensing devices 14 in the ride 80 may be more accurate than a single emitter/sensing device pair for the entire ride 80, in certain embodiments, all or a portion of the tracking system 10 may be disposed on the ride vehicle 82. That is, rather than attaching the emitter 12 and the sensing device 14 to the ceiling 90, or another fixed position relative to the ride vehicle 82, the emitter 12 and the sensing device 14 may be positioned on the ride vehicle 82. FIG. 4 illustrates such an embodiment, where all or a portion of the tracking system 10 is integrated into the ride vehicle 82. As shown, the emitter 12 and sensing device 14 of the tracking system 10 may be disposed in a front portion 100 of each row 102 in the ride vehicle 82 (e.g., facing toward where an occupant would be positioned while appropriately positioned in the ride vehicle 82). During operation, the emitter 12 may emit the light beam 24 toward an array of retro-reflective markers 30 (e.g., a pattern) on a seat 108. If certain of the retro-reflective markers 30 (e.g., positioned on a lower portion of the seat 108) reflect the light back to the sensing device 14, the controller 16 may determine that the seat 108 is empty. However, if a rider is sitting in the seat 108, the rider may block all or some of the retro-reflective markers 30 from reflecting the light beam 24 back to the sensing device 14. The sensing device 14 may detect, as discussed in further detail below with respect to FIG. 6, a change in the original pattern of the retro-reflective markers 30 (e.g., the pattern when the seat is not occupied), for example forming a changed pattern or no pattern of retro-reflective markers 30, or may detect a change in reflected light intensity from the retro-reflective markers 30, as discussed above with reference to FIG. 3. As a result of detecting such a change, the controller 16 may determine that a rider is present in the seat 108.

Due to variability in rider size and shape, it may be desirable to use an array 110 (e.g., as a pattern) of retro-reflective markers 30 disposed on the seat 108, so that the tracking system 10 can identify several points that are either covered or exposed to evaluate whether the rider 94 is present. This may make the determination more robust than if only a single retro-reflective marker 30 were used. However, any desirable number of retro-reflective markers 30 in any pattern and/or position may be present on the seat 108 to aid in detection of a person occupying the seat 108 throughout the ride.

The array 110 of retro-reflective markers 30 may also be particularly desirable on rides where some degree of rider movement is expected. That is, some rides with fast turns and lap bar restraints may allow the riders 94 to slide laterally within the seats 108 while still sufficiently restraining the rider 94 within the seat 108. Thus, the larger surface area of the array 110 of retro-reflective markers 30 may provide a useful indication that the riders 94 are still appropriately positioned in the seats 108. When the rider 94 shifts in the seat 108, one or more of the retro-reflective markers 30 may become uncovered (e.g., a change from a first detected pattern to a second detected pattern occurs), causing them to reflect electromagnetic radiation back to the corresponding sensing device 14. The controller 16 may determine approximately how many of the retro-reflective markers 30 are exposed and compare this to a threshold number of retro-reflective markers 30 that are expected to be uncovered if a rider were to exit the ride vehicle 82. As a more specific example, the controller 16 may determine a change in location and number of newly detected retro-reflective markers 30 resulting from rider movement, and make certain determinations and control actions as a result. In some embodiments, the threshold numbers or threshold changes in patterns may be determined between the number of retro-reflective markers 30 originally covered by the rider 94 before the ride starts.

In one embodiment, the controller 16 may monitor the specific pattern associated with a rider in a particular seat. That is, the controller 16 may determine that a certain number and location of retro-reflective markers 30 out of one or more rows and/or columns of a pattern of the retro-reflective markers 30 are covered by the rider 94 before the ride 80 begins. In other words, the controller 16 may associate a particular pattern with a particular rider (e.g., to produce an "associated pattern"). The associated pattern may correspond to a pattern of covered retro-reflective markers 30 (e.g., since the controller 16 will have a-priori information of the original pattern), a pattern of uncovered retro-reflective markers, or a combination thereof.

During operation of the ride 80, the controller 16 may monitor changes in the associated pattern via changes in numbers and/or locations in these rows and columns (e.g., when certain retro-reflective markers 30 are uncovered and/or covered), and perform control actions when appropriate based on a degree of rider movement associated with the change. By monitoring these changes in the associated pattern as opposed to changes against only the original pattern (e.g., before the rider sits in the seat), the controller 16 may be able to account for variations in rider size and shape, thereby resulting in more accurate monitoring.

The controller 16 may also associate different degrees of control and/or monitoring importance with different locations of the retro-reflective markers 30 within the associated pattern. For example, the controller 16 may associate a higher degree of control action and/or higher degree of monitoring importance with locations in the associated pattern where a change could potentially be indicative of a change in occupancy of the seat. The controller 16 may implement such embodiments, for example, by only allowing small degrees of changes in the associated pattern at such locations.

As another example, the controller 16 may use a reflected light intensity profile associated with the retro-reflective markers 30. In this way, the controller 16 may be able to distinguish between the reflection of a small number of retro-reflective markers 30 (or small portion of a single marker 30) that are exposed due to shifting in the seat 108 from a larger number of retro-reflective markers 30 (or larger portion of a single marker 30) that are exposed when the rider 94 is not in the seat 108. In other embodiments, the controller 16 may make the determination that a rider has left the seat 108 when a certain number below a threshold number of the retro-reflective sensors 30 reflect light into the sensing device 14. The amount of shifting of the rider 94 in the seat 108 may be quantified based on marker detection and utilized to control aspects of the ride 80. For example, a specific rider may receive an automated communication regarding proper positioning prior to starting a ride.

As shown by way of example in FIG. 4, the array 110 of retro-reflective markers 30 may be disposed in a lumbar region 114 (e.g., a lower region) of the seats 108. The lumbar region 114 may generally refer to an area of a ride seat back section where a rider's lower back would be positioned. It may be expected that whenever a person is properly situated in the seat 108, this lumbar region 114 will generally be covered. Accordingly, if the lumbar region 114 becomes uncovered by the rider 94, the controller 16 may determine that it is unlikely that the rider 94 is appropriately positioned in the seat 108. If the status of one of the seats 108 changes (e.g., detecting a rider present in the seat 108 and then not detecting a rider in the seat 108) during the ride, the controller 16 of the tracking system 10 may send a signal to a control panel of the ride 80 to stop the ride 80 and/or to output an alert notifying the ride operators that a person is missing from the ride vehicle 82. It should be noted that a single tracking system 10 separate from the ride vehicle 82 may also be used for multiple ride vehicles 82 and/or seats 108.

In some embodiments, the total number of retro-reflective markers 30 disposed on the seat 108, the acceptable number of retro-reflective markers 30 that may be exposed without indicating a rider is out of the seat 108, and/or the position of the retro-reflective markers 30 disposed on the seat 108 may vary from ride to ride. These values may be different depending on the minimum height for riders that can ride in the ride vehicle 82, the dynamics of the ride (e.g., fast, slow, jolting, smooth), and the manner in which the rider is restrained. That is, rides that are made for children and are relatively smooth may not include as many retro-reflective markers 30 as an adult ride that is rough and allows some shifting in the seats 108.

In accordance with present embodiments, the retro-reflective markers 30 may be positioned along one or more parts of the seat 108 (e.g., a headrest, a restraint) including on the lumbar region 114. FIG. 5 illustrates an embodiment of the seat 108 having the retro-reflective markers 30 positioned in different locations, which may enable the controller 16 to perform additional restraint monitoring and control. In the illustrated embodiment, the seat 108 includes a base 120 where the rider 94 may sit, a back section 124 to support the rider's back, a headrest 126 to support the rider's head, and a restraint 130 configured to be lowered down across the rider's chest and lap to maintain the rider in the seat 108. However, it should be noted that other types, arrangements, sizes, and shapes of seats 108 may be utilized within other ride vehicles 82 in accordance with present embodiments. For example, the ride vehicle illustrated in FIG. 4 includes pairs of seats 108 disposed side by side, these pairs of seats 108 being arranged in the rows 102 within a single ride vehicle 82. In this type of ride vehicle 82, each row 102 may include a single restraint bar 130 that lowers down over both riders in the row 102.

As illustrated in FIG. 5, the seat 108 includes the array 110 of retro-reflective markers 30 in the lumbar region 114 of the back section 124 near or transitioning to the seat section 120. In this way, the tracking system 10 may accurately assess the status (e.g., occupied or unoccupied) of the seat 108. In some embodiments, the restraint 130 also includes the retro-reflective markers 30 to facilitate determining its position by the emitter 12 and sensing device 14, which may be separate or integral with the seat 108. In embodiments where the tracking system 10 is integral with the seat 108, the emitter 12 and the sensing device 14 may be positioned, for example, above the headrest 126 of the seat 108 or in the restraint 130.

The tracking system 10 may perform restraint monitoring using the retro-reflective markers 30 positioned at these different locations. For example, in certain embodiments, the controller 16 may monitor a pattern associated with the retro-reflective markers 30 in the lumbar region 114 against a pattern associated with the retro-reflective markers 30 on the restraint 130. In monitoring both patterns against each other, the controller 16 may monitor the proximity of the restraint 130 to the lumbar region 114, and therefore monitor whether the restraint 130 is in an appropriate position to restrain the rider 94 during the ride. As non-limiting examples, the controller 16 may monitor an apparent size of the markers 30 on the restraint 130 versus an apparent size of the markers 30 on the lumbar region 114, may monitor differences in intensities between the markers 30 on the restraint 130 and markers 30 on the lumbar region 114, may monitor a proximity of the markers 30 on the restraint 130 and markers 30 on the lumbar region 114, and the like. As discussed in further detail below, the use of different colors (e.g., reflected wavelengths) may facilitate such monitoring. Further examples of the manner in which ridership and rider restraint may be monitored may be further appreciated with reference to FIGS. 6-12 and 13-16, respectively.

Figure 6:
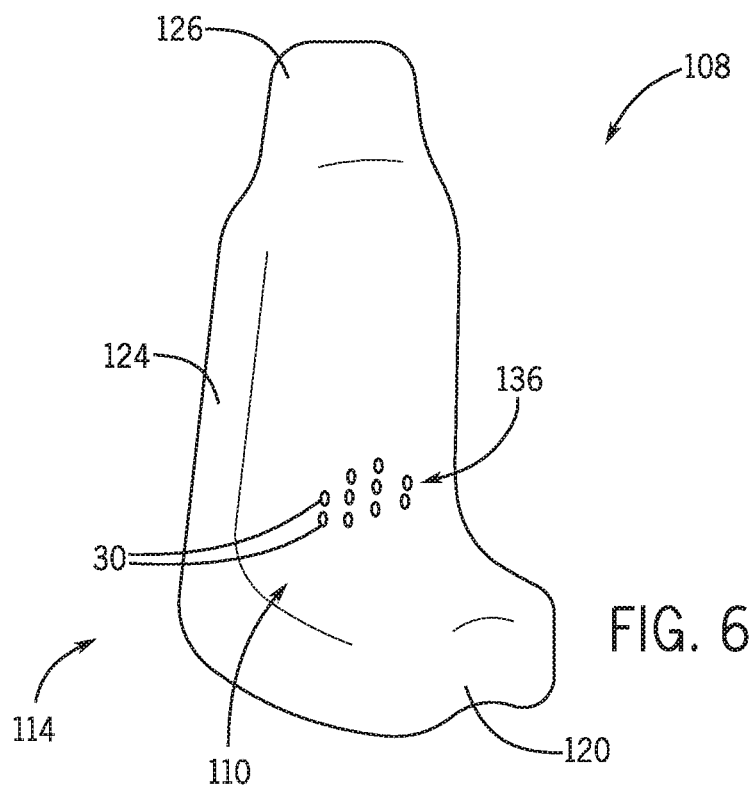
FIG. 6 is a schematic perspective view of a seat having a pattern of retro-reflective markers corresponding to an unoccupied seat, in accordance with an embodiment of the present disclosure.
Figure 7:
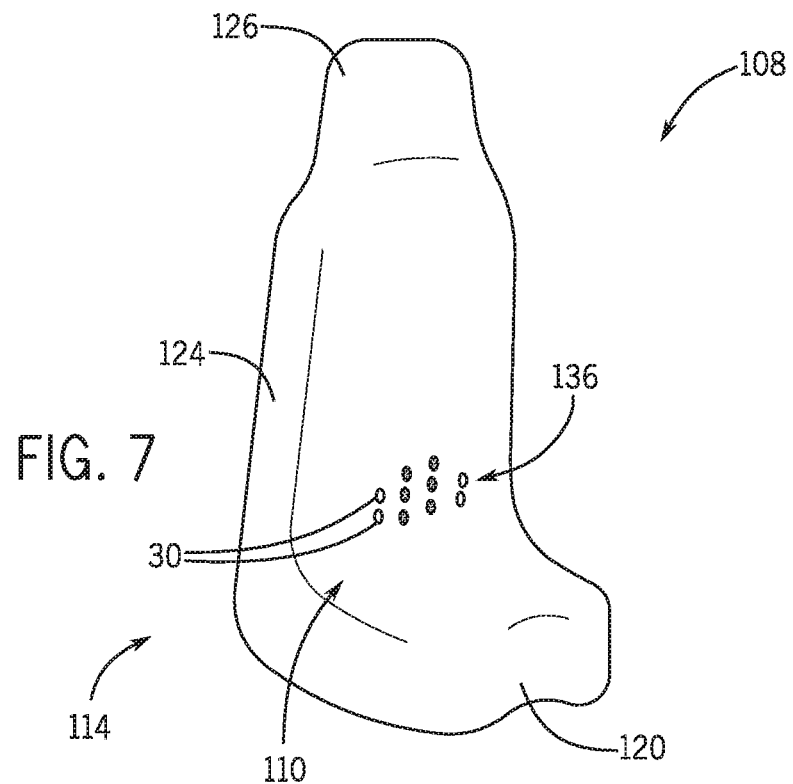
FIG. 7 is a schematic perspective view of the seat of FIG. 6 having a pattern of retro-reflective markers corresponding to an occupied seat, in accordance with an embodiment of the present disclosure.

As discussed above, the tracking system 10 may detect a change in a pattern of the retro-reflective markers 30 to determine ridership and/or rider movement during operation of the ride 80. FIG. 6 illustrates an embodiment of the seat 108 having the retro-reflective markers 30 arranged in a first pattern 136 on the back section 124. Certain features of the seat 108 have been omitted to facilitate discussion of FIG. 6, and it should be appreciated that the disclosed embodiments may be used in combination with any of the other embodiments disclosed herein as appropriate. The retro-reflective markers 30 may be arranged in any appropriate pattern, such as a grid, diamond, lines, circles, squares, or the like. The first pattern 136 may include retro-reflective markers 30 spaced apart by a distance that allows the rider 94 or ride objects (e.g., the ride restraint 130) to be detectable (e.g., inferentially by blocking one or more of the retro-reflective markers 30). The controller 16 may identify the first pattern 136 and correlate the seat 108 with an unoccupied state. When the rider 94 occupies the seat 108, one or more of the retro-reflective markers 30 are blocked. FIG. 7 illustrates an example of a second pattern 138 associated with one or more blocked retro-reflective markers 30 (as shown by the filled in circles). The sensing device 14 may detect reflected light from the unblocked retro-reflective markers 30 (as shown by unfilled circles), and the controller 16 may identify the second pattern 138 as corresponding to an occupied seat 108. For example, the controller 16 may perform a comparison of the detected light from the unblocked retro-reflective markers 30 in the second pattern 138 with stored positions of the retro-reflective markers 30 in the first pattern 136.

Figure 8:
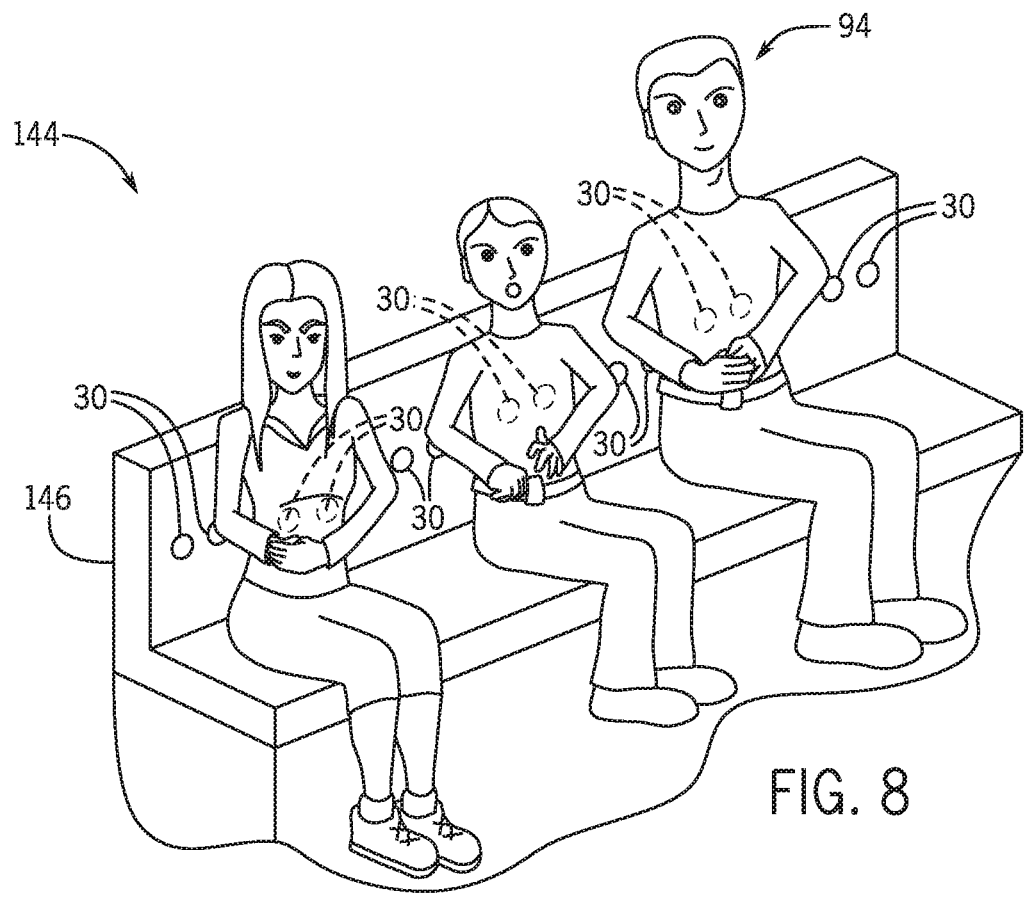
FIG. 8 is a schematic perspective view of a seat having retro-reflective markers for use with the tracking system of FIG. 1 to track a number of riders positioned within the seat, in accordance with an embodiment of the present disclosure.

The tracking system 10 may also be used to ensure an appropriate number of riders are seated in the row 102 of the ride vehicle 82. For example, in certain amusement attractions, the ride vehicle 82 includes a bench seat rather than individual seats, similar to seat 108. Unlike individual ride seats (e.g., the seat 108), bench seats generally accommodate several riders. However, at times, an undesirable number of riders may occupy the bench seat. FIG. 8 illustrates a bench seat 144 that may use the tracking system 10 to determine the number of riders 94 that occupy the bench seat. Similar to the seat 108, the bench seat 144 includes the retro-reflective markers 30 along a bench back section 146. Before operation of the amusement attraction 80, the controller 16 may determine if the number of riders 94 exceeds a rider limit for the bench seat 144. For example, when the riders 94 occupy the bench seat 144, the riders 94 may block a portion of the retro-reflective markers 30 (shown in phantom). The sensing device 14 may detect a decrease in reflected light intensity due to blocked retro-reflective markers 30 or specifically detect that certain retro-reflective markers 30 are not visible (e.g., based on a change of the first pattern associated with an unblocked array of the retro-reflective markers 30). The controller 16 may associate the decrease in reflected light intensity or missing retro-reflective markers 30 with a pattern of retro-reflective markers 30 that indicates the number of riders 94 on the bench seat 146. If the number of riders 94 exceeds a threshold value (stored in the memory 44), the controller 16 may send an output signal to the control panel for the ride 80 that alerts the ride operator that the bench seat 146 has too many riders. The controller 16 may provide a real-time feedback to the ride operator, for example, a running head count of the number of riders 94 entering the ride 80 and occupying the bench seat 146. In some embodiments, the controller 16 may send a no-go signal to the control panel of the ride 80 so that the ride 80 is not allowed to leave the station unless the bench seat 144 has a desirable number of riders 94. Once the number of riders 94 occupying the bench seat 146 is at or below the threshold value, the controller 16 may send a go signal to the control panel and the ride 80 may leave the loading station. In certain embodiments, an override may be provided for use by the ride operator.

Figure 9:
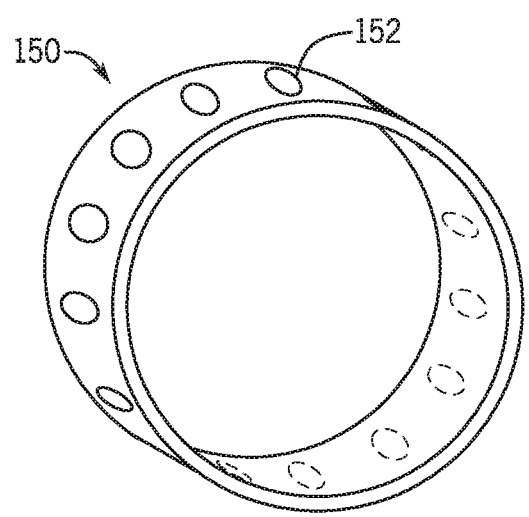
FIG. 9 is a schematic perspective view of a wearable item in the form of a wristband, the wristband having retro-reflective markers for use with the tracking system of FIG.

In certain embodiments, the tracking system 10 may determine a status of the seat 108 or a position of the rider 94 with respect to the ride vehicle 82 using a wearable version of the retro-reflective marker 50. For example, at any time before the riders 94 enter the loading section of the ride 80, each rider 94 may be given a wearable retro-reflective marker (e.g., a wristband, a necklace, a button). FIG. 9 illustrates an embodiment of a wristband 150 that may be used by the tracking system 10 to determine a location of the rider 94 and a status of the seat 108. The wristband 150 includes one or more wearable retro-reflective markers 152. The wearable retro-reflective markers 152 may be positioned on the wristband 100 in such a way that light reflected from the wearable retro-reflective markers 152 is detected by the sensing device 14. For example, as illustrated, the wearable retro-reflective markers 102 may be distributed around a circumference of the wristband 102. In this way, at least one of the wearable retro-reflective markers 102 may reflect the light beam 24 when the rider 94 is in the detection area. In certain embodiments, the wristband 150 may include a single retro-reflective marker 102 (e.g., a strip of retro-reflective material) that partially or completely wraps around the wristband 150. In other embodiments, the wristband 150 may be made entirely of the retro-reflective material. As an example, the controller 16 may monitor the retro-reflective markers 152 on the wristband 150 (or other wearable item) in relation to retro-reflective markers 30 on the seat 108 to establish rider occupancy, rider movement, and so forth.

In other embodiments, the wearable retro-reflective markers 152 may be disposed on an object that belongs to the rider 94. For example, the rider 94 may place an adhesive dot or button that includes the wearable retro-reflective marker 152 onto their personal belongings such as, but not limited to, a backpack, purse, wallet, hat, glasses, or any other personal item. By placing the wearable retro-reflective marker 152 on the rider's items, these items may be located by the tracking system 10 in the event that the rider's items get lost or fall out of the ride 80.

The retro-reflective markers 30 and the wearable retro-reflective markers 152 may include different retro-reflective materials such that each retro-reflective marker 30 and 152 reflect the light beam 24 differently (e.g., at a different wavelength, frequency, or angle). In this way, the tracking system 10 may use the retro-reflective markers 30 and 152 to assess the status of the seat 108 and a location of the rider 94 (or the rider's belongings) relative to the seat 108 and/or the ride vehicle 82, as described in detail below with reference to FIG. 10. Additionally, the tracking system 10 may track the rider's motion within the detection area. This may allow an operator of the ride 80 to identify riders that may be, for example, looking for an empty ride vehicle 82 to occupy.

FIG. 10 illustrates a process flow diagram of a method 160 of operating the ride 80 that uses the tracking system 10 for tracking the riders 94 using the retro-reflective markers 30 and 152. As should be noted, certain steps in the method 160 may be implemented as instructions stored in the memory 44 and that are executable by the one or more processors 42 of the controller 16. In the method 160, one or more riders 94 enter the loading area of the ride 80 (step 162). The loading area may generally be within the detection area 26 of the tracking system 10.

Following entrance of the riders 94, the method 160 includes detecting the retro-reflective markers 30 and 152 positioned on the ride 80 and/or the riders 94 with one or more of the sensing devices 14 (step 164). For example, during loading of the ride 80, the riders 94 are positioned within the detection area 96. Accordingly, the sensing device 14 is able to detect light reflecting off of the wearable retro-reflective markers 152. The controller 16 may monitor a movement of the wearable retro-reflective markers 152 as the rider 94 moves towards the ride vehicles 82. Before the riders 94 occupy the ride vehicles 82, the sensing device 14 may also detect the retro-reflective marker 30 on the seat 108. Once the riders 94 have occupied the seat 108, the sensing device 14 may detect a change in an existing pattern of retro-reflective markers 30 on the seat 108, a decrease in reflected light intensity from the retro-reflective markers 30, or both. For example, as discussed above, the rider 94 may block some or all of the retro-reflective markers 30 when they are positioned in the seat 108. As such, the sensing device 14 detects a change in a reflected light pattern from the retro-reflective markers 30. While this blocking of the retro-reflective markers 30 may be sufficient for occupancy detection, the sensing device 14 may also receive reflected light from the wearable retro-reflective markers 152, and use this for redundant occupancy detection, such as to limit the number of riders on the seat 108. Because the retro-reflective markers 30 and 152 reflect light differently, the controller 16 may determine that the seat 108 is occupied by the rider 94, and in some embodiments may determine the number of riders 94 in the seat 108.

As discussed above, the tracking system 10 may keep an accurate count of the number of riders 94 present on the particular ride 80. Accordingly, the illustrated method 160 also includes determining (query 166) if all the riders 94 that have entered the loading area of the amusement attraction 80 are positioned within the ride vehicles 82. For example, the seats 108 having retro-reflective markers 30 with an attenuated (decrease in reflected light intensity) or a blocked signal should correspond to the number of riders 94 within the detection area of the ride 80. If all the riders 94 occupy a ride seat, the controller 16 may provide a signal to the control panel of the ride alerting the ride operator that all the counted riders 94 are positioned in one of the seats 108.

The method 160 may also include actuation and release of the ride 80 from the loading section (step 168). The ride 80 may be manually actuated by the ride operator or the controller 16 may send a go signal to the control panel for automatic actuation of the ride 80. In contrast, if the number of occupied ride seats does not correspond to the number of riders 94 detected in the loading area, the controller 16 may actuate an alarm or send a no-go signal to the control panel. Accordingly, the ride 80 may not be released from the loading station and the method 160 repeats until all the riders 94 occupy a seat 108 or an override is activated.

The method 160 may also include determining (step 172) if all the riders 94 have exited the ride 80 after each ride cycle. For example, once all the riders 94 have exited the ride 80, the sensing device 14 may detect the original, non-blocked pattern of retro-reflective markers 30 in each of the seats 108. In certain embodiments, the sensing device 14 may detect an increase in reflected light intensity from the retro-reflective markers 30 and a decrease in reflected light intensity from the wearable retro-reflective markers 152. As a result, the controller 16 may determine that all the riders 94 have exited the unloading area of the ride 80. Accordingly, the controller 16 may provide a signal to the operator that a following group of riders 94 may load the amusement attraction 80 and the method 160 repeats.

In addition to, or in lieu of, tracking the status of the ride seat and location of riders relative to ride vehicles, the tracking system 10 may be used to determine if the rider meets ride size requirements. For example, in certain embodiments, the amusement attraction 80 may require the riders 94 to be a certain height. Generally, the rider's height is evaluated prior to entering the ride. However, the rider's height may be influenced by their footwear and/or posture during height measurement, and thereby result in inaccurate height assessment. In addition, due to rider size variability, it may be desirable to assess positioning of ride restraints relative to the rider even if the rider meets the height requirement for the ride 80.

FIG. 11 is an embodiment of the seat 108 including the retro-reflective markers 30 arranged such that the rider size may be assessed within the seat 108. In the illustrated embodiment, the retro-reflective markers 30 are positioned on the headrest 126 and an upper region 180 of the seat 108. As should be noted, the headrest 126 and the upper region 180 may include one retro-reflective marker 30 or an array of retro-reflective markers 30. In certain embodiments, the retro-reflective markers 30 on the headrest 126 and the upper region 180 may be used instead of, or in addition to, the retro-reflective markers 30 in the lumbar region 114 to track seat status, as discussed above with reference to FIGS. 5-7. In the illustrated embodiment, the emitter 12 and the sensing device 14 are positioned in front of the seat 108 (e.g., in another seat). However, in other embodiments, the emitter 12 and the sensing device 14 may be positioned in different locations (e.g., on the ceiling 90 of the ride 80). In one embodiment, the seat 108 may include an indicator 182 (e.g., a light) that alerts the operator that the rider 94 meets or does not meet the size requirements for the ride 80.

In use, the sensing device 14 may detect a decrease in reflected light intensity or detect reflected light from a specific set of retro-reflective markers 30 associated with a pattern of exposed retro-reflective markers 30 and retro-reflective markers 30 blocked by the rider 94, as discussed above with reference to FIGS. 5-7. The controller 16 may use this information to determine whether or not the rider 94 meets the ride size requirement. FIG. 12 is a process flow diagram of a method 200 that includes operations performed by the controller 16 for rider size assessment using, for example, the seat 108 of FIG. 11. Similar to the method 160, instructions for performing certain steps in the method 200 may be stored as instructions in the memory 44 and are executable by the one or more processors 42 of the controller 16. In step 202 of the method 200, the rider 94 occupies the seat 108 of the ride 80. Based on the size of the rider 94, the rider 94 may block one or more of the retro-reflective markers 30, for example a particular set of the retro-reflective markers 30. This may cause a certain pattern of retro-reflective markers 30 to illuminate and/or reflect light. In the context of height determination, the pattern associated with illuminated retro-reflective markers 30 in an upper region of the seat 108, such as at the head rest 126, may be particularly important.

Accordingly, the method 200 includes detecting the retro-reflective markers 30 on the headrest 126 and the upper region 180, in step 204. As discussed above, the sensing device 14 may detect a change in pattern of the retro-reflective markers 30, sometimes as a decrease in reflected light intensity from the retro-reflective markers 30 or as identification of discrete points corresponding to markers forming a specific pattern. Consequently, the controller 16 may assess the size of the rider 94 relative to the seat 108 based on the change in the pattern (e.g., reduction in number of illuminated/reflecting retro-reflective markers 30 in the headrest 126).

The method 200 also includes determining (query 208) if the rider 94 meets the size requirements for the particular ride. For example, if the rider 94 blocks one or more retro-reflective markers 30 on the headrest 126, the sensing device 14 may detect a smaller column of the retro-reflective markers 30 on the headrest 126 of FIG. 11 than was present before the rider sat in the seat 108. The controller 16 may, for example, compare the detected pattern against stored patterns, compare the detected light intensity against stored light intensities, compare a detected number of retro-reflective markers against stored numbers of retro-reflective markers, and so forth, to determine a size of the rider. For example, the controller 16 may utilize a look-up table or similar data structure where light intensity, patterns, and/or numbers of retro-reflective markers 30 are associated with different rider heights and/or size profiles. However, in a general sense, the controller 16 may simply compare detected values associated with detected retro-reflective markers 30 against threshold values or ranges of values to make the determination of query 208. In this way, if the number or pattern of retro-reflective markers 30 indicates a person of an appropriate size, the controller 16 may determine that the ride can begin.

Therefore, if the controller 16 determines that all riders are of an appropriate size, the controller 16 may actuate (step 212) a signal to start the ride. For example, in certain embodiments, the controller 16 may send a go signal to the indicator 182 or the control panel for the ride alerting the ride operator to start the ride, and the ride vehicle is allowed to leave the loading area. The indicator may display a first colored light (e.g., green) indicative of a suitable rider size. In certain embodiments, the control panel of the ride may display an alert associated with the go signal such that the ride operator may manually start the ride. In other embodiments, the go signal may automatically actuate the ride. As should be noted, a change in light intensity and/or pattern of retro-reflective makers 30 on both the headrest 126 and the upper region 180 may need to be detected by the sensing device 14 for the controller 16 to actuate the go signal for the ride.

In contrast, if the rider 94 does not meet the height requirement for the ride 80, the rider 94 will not block the retro-reflective markers 30 and the sensing device 14 does not detect any change in reflected light intensity and/or the change does not meet a desired threshold. The controller 16 may determine that the rider 94 does not meet the size requirement for the particular ride. As such, the indicator 182 may display a second colored light (e.g., red) indicative of an unmet rider size requirement. Therefore, in step 220, the ride does not start. For example, the controller 16 may send a no-go signal to the control panel of the ride so that the ride is not allowed to leave the loading area unless the rider 94 is removed from the ride. In certain embodiments, the second colored light may be flashing to draw attention to the ride operator that the rider 94 does not meet the size requirements. However, in other embodiments, the second colored light is continuous (e.g., non-flashing). Similarly, if the retro-reflective markers 30 on the upper region 180 of the seat 108 are unblocked by the rider 94, the sensing device 14 (on the restraint 130 or the ceiling 90) may not detect a desirable change in pattern of the retro-reflective markers 30, and the controller 16 may actuate the no-go signal. For instance, in some embodiments, riders may be required to block certain retro-reflective markers 30 with their hands to allow a ride to begin and/or assess the rider's size. This may be required in conjunction with blocking of the retro-reflective markers 30 (e.g., with the rider's head) to get a go signal.

As set forth above, in addition to or in lieu of using retro-reflective markers 30 to determine whether a rider is in the seat 108 or the rider has met a ride size requirement, embodiments of the tracking system 10 may be utilized to determine whether or not a rider is securely restrained in the ride vehicle 82 prior to the start of the ride. Evaluating the restraints via the automated tracking system 10 may increase the efficiency of loading the ride vehicle 82, securing the riders in their seats 108, and initiating the ride sequence.

FIGS. 13 and 14 provide an example of one such restraint evaluation system 230 on the ride vehicle 82. The restraint evaluation system 230 includes a lap bar restraint 232 in the illustrated embodiment, though it should be noted that in other embodiments, different types of restraints (e.g., pulled down from above the head such as the restraint 130) may be evaluated using similar systems.

The restraint evaluation system 230 includes one or more retro-reflective markers 30 positioned on a surface (e.g., front portion 202) of the ride vehicle 82. The restraint evaluation system 230 is designed so that the retro-reflective markers 30 are completely covered when the restraint 232 is lowered from an upright position 234 into a locked position, as shown in FIG. 13. In the illustrated embodiment, for example, the restraint 232 may include an extension 236 that is configured to cover the retro-reflective markers 30 when the restraint 232 is secured in the locked position (or, more generally, an appropriate restraint position). In the illustrated embodiment, the ride vehicle 82 includes the emitter 12 angled such that the emitted light beam 24 will hit the retro-reflective markers 30 if the restraint 232 is not fully lowered into the locked position, enabling the markers 30 to reflect the light back toward the sensing device 14, as shown by arrow 238 in FIG. 14. In the illustrated embodiment, the emitter 12 is positioned along a lower portion 240 of the ride vehicle 82. In other embodiments, the emitter 12 and/or sensing device 14 may be mounted in other places, such as on a ride loading area alongside the ride vehicle 82. The sensing device 14 sends a signal 242 indicative of the presence or absence of reflected electromagnetic radiation to the controller 16, which may provide an indication to a ride operator that the restraint 232 is either secured or unsecured. In some embodiments, the controller 16 may send a go/no-go signal to a control panel of the ride so that the ride is not allowed to leave the station unless all of the restraints 232 are in the proper locked position, according to the restraint evaluation system 230.

In addition to tracking the riders 94, ride elements, or other objects associated with the ride 80 based on light intensity and/or pattern changes of the retro-reflective markers 30, present embodiments also include tracking positions of the riders 94 and/or ride elements based on color recognition of the retro-reflective markers 30. For example, in certain embodiments, the retro-reflective markers 30 may include sets of one or more markers, where each set (e.g., forming its own pattern or as individuals) reflect light at a different wavelength that corresponds to a color (e.g., red, orange, yellow, green, blue, violet). For example, the retro-reflective markers 30 may reflect a wavelength within the visible spectrum range such as between approximately 380 nm to 750 nm. However, the different wavelengths may be within any suitable wavelength range within the electromagnetic spectrum. Because the retro-reflective markers 30 may reflect light at a different wavelength, in a simple scenario, the tracking system 10 may determine a position of one retro-reflective marker 30 relative to a second retro-reflective marker 30. This may be advantageous is determining proper positioning of the riders 94 and/or ride elements (e.g., ride restraint systems that are separate pieces, but may need to be attached during operation of the ride).

FIGS. 15 and 16 illustrate an embodiment of the restraint 130 that may utilize retro-reflective markers 30 that reflect light at different wavelengths. The restraint 130 includes a belt 244 having a male connector 246 (e.g., a fastener, hook) and a female connector 248 (e.g., a buckle). The male connector 246 includes one or more of the retro-reflective markers 30 that reflect light at a first wavelength and the female connector 248 includes one or more of the retro-reflective markers 30 that reflect light at a second wavelength different from the first. Prior to the rider 94 occupying the ride seat 108, the connectors 246, 248, may be uncoupled. Therefore, the retro-reflective markers 30 on the connector 246 are separated by a distance α from the retro-reflective markers 30 on the connector 248. The controller 16 may identify the distance α between the retro-reflective markers 30 on the respective connector 246, 248 as corresponding to uncoupled connectors.

Once the rider 94 occupies the seat 108, the tracking system 10 may monitor the distance α between the retro-reflective markers 30 on the connectors 246 and 248 to determine a position of the connectors 246, 248 with respect to one another. Accordingly, the controller 16 may determine when the connectors 246 and 248 are coupled. FIG. 16 illustrates the connectors 246 and 248 in a coupled configuration. As illustrated, the distance between the retro-reflective markers 30 decreases when the connectors 246 and 248 are coupled. The controller 16 may determine a change in the distance α (e.g., Δα) between the connectors 246 and 248. Based on the change in the distance α, the controller 16 may indicate to the ride operator that the connectors 246 and 248 are properly connected, based on the detected distance. The controller 16 may send a go/no-go signal to the ride control panel based on the distance α. For example, if the controller 16 determines that the change in the distance α corresponds to coupled connectors 246 and 248, the controller 16 may send a go signal to the ride control panel to release the ride vehicle 82 from the loading station. The tracking system 10 may monitor the distance d between the retro-reflective markers 30 on the connectors 246, 248 throughout the duration of the ride 80. Accordingly, if the distance d between the retro-reflective markers 30 of coupled connectors 246, 248 changes during operation of the ride 80 (e.g., the distance α increases), the controller 16 may alert the rider operator that the connectors 246, 248 are not properly coupled, may provide an alert to the rider, and so forth.

Other types of restraint evaluation may be provided by the tracking system 10. For example, in certain embodiments, the restraint evaluation system 230 may be used to determine whether a ride door is properly secured. FIG. 17 is an embodiment of the ride vehicle 82 having a door 250 designed to secure the rider 94 in the ride vehicle 82. In the illustrated embodiment, the ride vehicle 82 includes the retro-reflective markers 30 at an interface 252 between a ride wall 254 and a door wall 256. Alternatively, the retro-reflective markers 30 may be positioned on the door wall 256. During operation, the restraint evaluation system 230 may evaluate the status of the ride door 250 (e.g., open or closed) by detecting a change in light reflected from the retro-reflective markers 30 (e.g., corresponding to movement of the markers 30 and covering of the markers 30). That is, if the ride door 250 is closed, as illustrated in FIG. 18, the door wall 256 blocks the retro-reflective markers 30 on the ride wall 254, and the sensing device 14 detects a change in the reflected light (e.g., a decrease in reflected light intensity) or may not detect any reflected light. The decrease in reflected light intensity may indicate that the ride door 250 is closed, and the ride may be allowed to leave the loading station.

In other embodiments, the tracking system 10 may be used to ensure the riders 94 remain within a boundary region of the ride 80. This may be beneficial in ensuring that the riders 94 remain properly positioned and follow proper ride procedures throughout the duration of the ride cycle. The amusement attraction may include retro-reflective markers 30 around a perimeter of the boundary region. For example, FIG. 19 is an overhead schematic view of an embodiment of the ride vehicle 82 that includes a boundary region 262. In certain embodiments, the boundary region 262 may be around an outer perimeter 264 of the ride that may be detected by the tracking system 10. In other embodiments, the boundary region 262 may extend a certain distance away from the outer perimeter 264, as shown with reference to FIG. 19. Specifically, for example, the boundary region 262 may be defined relative to the detected location of the retro-reflective markers 30. During operation of the ride, the rider 94 may be advised to remain within the boundary region 262. As an example illustrated in FIG. 20, when a rider crosses into the boundary region 262, the sensing device 14 may detect a change in reflected light intensity. Accordingly, the controller 16 may provide control signals to the control panel of the ride that may provide instructions to stop the ride or provide a warning signal (e.g., visual and/or audible alarm). In certain embodiments, the tracking system 10 may detect the wearable retro-reflective markers 152 on the wristband 150 worn by the rider 94 to determine whether the rider 94 crossed the boundary region 262 or if the change in reflected light intensity from the retro-reflective markers 30 in the boundary region 262 was due to an anomaly.

FIG. 20 illustrates an overhead schematic of a centrifugal amusement attraction 266 that may also utilize the boundary region 262 to ensure that the rider remains in a predetermined location of the ride. While in the centrifugal amusement attraction 266, the rider 94 is positioned within an area 268 between the boundary region 262 and the outer perimeter 264. During operation of the centrifugal amusement attraction 266, a centrifugal force 270 pushes the rider 94 against the outer perimeter 264 and away from the boundary region 262. However, if the centrifugal force is less than desired, as indicated by arrow 272, the rider 94 may move towards the boundary region 262. Therefore, if the rider 94 crosses into the boundary region 262, the controller 16 may instruct the ride, or an operator of the ride, to adjust a rotational speed of the ride to increase the centrifugal force or stop the ride. Detection of this may be achieved by providing an array of retro-reflective markers 30 on a platform occupied by a rider. By detecting which retro-reflective markers 30 are visible, the rider's location on the platform can be monitored.

FIG. 21 illustrates a process flow diagram of a method 280 for evaluating a position of a rider of the centrifugal amusement attraction 266 relative to the boundary regions 262 illustrated and described with reference to FIGS. 19 and 20. Similar to the methods 160 and 200, the method 280 may include steps that are stored as instructions in the memory 44 and that are executable by one or more processors 42 of the controller 16. It should be noted that in some embodiments, steps of the method 280 may be performed in different orders than those shown, or omitted altogether. In addition, some of the blocks illustrated may be performed in combination with each other.

In the illustrated embodiment, the method 280 includes determining a location of the rider 94 based on a position of the reflected electromagnetic radiation received by the sensing device 14 of the tracking system 10, in step 282. Again, this position may be determined based on a detection of electromagnetic radiation reflected from retro-reflective markers 30 disposed in an area generally occupied by the rider 94 (e.g., the seat 108, bench seat 144, area 266) and/or the wearable retro-reflective markers 152.

The method 280 also includes detecting a boundary (e.g., the boundary region 262) to the ride, in step 284. For example, the sensing device 14 may detect the retro-reflected markers 30 around the perimeter of the boundary region 262 associated with the ride 80. Using the detected reflected light, the controller 16 may determine a pattern of the retro-reflective markers 30. The controller 16 may compare the pattern of the detected retro-reflective markers 30 with a predetermined pattern corresponding to the boundary region 262.

In step 286, the controller 16 determines a proximity of the rider 94 to the boundary. In an embodiment, the controller 16 may monitor a pattern of the retro-reflective markers 30, and monitor changes to this pattern that may be an indication that a rider has entered a region of the ride 80 that is generally undesirable (e.g., the boundary region 262). As another example, in certain embodiments, the rider 94 may use the wearable retro-reflective marker 152 during operation of the centrifugal amusement attraction 266. The controller 16 may determine a distance between the retro-reflective markers 30 associated with the boundary region 262 and the wearable retro-reflective marker 152 on the rider 94. Using the distance between the retro-reflective markers 30 and 152, the controller 16 may determine the proximity of the rider 94 to the boundary region 262. In still further embodiments, the controller 16 may determine a change in reflected light intensity from the retro-reflective markers 30 at the boundary region 262. For example, as the rider 94 approaches the boundary region 262, the reflected light intensity from the retro-reflective markers 30 may decrease.

In addition, the method 280 includes comparing the determined proximity with a predetermined threshold value in step 288. That is, the controller 16 may determine a pattern change or reflected light intensity profile associated with the retro-reflective markers 30 or a distance relationship between retro-reflective markers 30 and 152.

If the determined proximity is less than or equal to the threshold value, the method 280 includes adjusting (step 290) an operational parameter of the ride. As discussed above, the controller 16 of the tracking system 10 may send a control signal to a control panel of the ride to actuate this adjustment and/or stop the ride. If the determined proximity is greater than the threshold, however, no change is made and the method 280 repeats.

The present disclosure may also be applicable to rides that are used outdoors (e.g., even in sunlight), such as water-based rides. For example, present embodiments of the tracking system 10 may use light reflection techniques to provide zone control assistance on the water-based rides. For example, FIG. 22 illustrates a waterslide 300 that is at least partially enclosed within a tube 302. Once someone enters the waterslide 300 from an elevated platform 304, it may be difficult for the lifeguard at the top of the elevated platform 304 to determine when it is time for the next rider to go down the waterslide 300. In certain waterslides 300, the lifeguard may need to wait until the rider emerges from the enclosed tube 302 at the end of the waterslide 300 to ensure that the rider is moving through the tube 302 as desired and that enough time has passed for another rider to enter. Using the tracking system 10, however, it may be possible to minimize the amount of time between each rider entering the waterslide 300 from the elevated platform 304. To that end, the tube 302 may be equipped at one or more points along the length of the waterslide 300 with one or more of the emitters 12 and sensing devices 14. The waterslide 300 may also include a waterslide seat (e.g., a mat, an inflatable tube). The water slide seat 306 may include one or more of the retro-reflective markers 30. The sensing device 14 may detect riders as they pass through the waterslide 300. This detection may be made based on the expected signature of the light beam 24 reflecting off the rider going past, or based on light reflected off retro-reflective markers 30 disposed on a tube 306. The sensing device 14 may communicate (e.g., wirelessly) with the controller 16 of the tracking system 10 and the controller 16 may provide a control signal to the actuatable device 18. In this case, the actuatable device 18 may include a light 308, or other visual indicator, on the elevated platform 304 configured to indicate that the tracking system 10 has determined that the previous rider is passing the sensing device 14 in the waterslide 300. This light 308 signals the lifeguard to send the next rider down the waterslide 300, thus increasing the efficiency of operation of the waterslide 300.

Similar to the embodiments discussed above with reference to FIGS. 5-7, the tracking system 10 may monitor a position of the rider with respect to the waterslide seat 306. For example, based on an intensity change of reflected light or a pattern of unblocked retro-reflective markers 30, the tracking system 10 may determine if the rider is separated from the waterslide seat 306 while in the tube 302.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An amusement park attraction system comprising:
a tracking system configured to monitor ridership, rider movement, or ride readiness of a plurality of ride vehicles based at least on identification and tracking of a plurality of retro-reflective markers associated with the plurality of ride vehicles, wherein the plurality of retro-reflective markers associated with the plurality of ride vehicles comprises an array of retro-reflective markers disposed on one or more seats of a respective ride vehicle of the plurality of ride vehicles, wherein the one or more seats of the respective ride vehicle are a portion of the respective ride vehicle whereon a passenger sits, wherein the tracking system comprises:
one or more emitters configured to emit light, wherein the one or more emitters are located relative to a ride path, upon which the plurality of ride vehicles are configured to travel, such that the one or more emitters are able to emit the light toward the plurality of retro-reflective markers associated with the plurality of ride vehicles;
one or more detectors configured to detect retro-reflected light, wherein the one or more detectors are located relative to the ride path such that the one or more detectors are able to receive retro-reflected light from the plurality of retro-reflective markers associated with the plurality of ride vehicles, wherein the plurality of retro-reflective markers are configured to return the retro-reflected light to the one or more emitters; and
a controller coupled to the one or more detectors and configured to determine the ridership, the rider movement, or the ride readiness of the plurality of ride vehicles based on identification of which of the plurality of retro-reflective markers associated with the plurality of ride vehicles are retro-reflecting the light, and wherein the controller is configured to adjust an operational parameter of the plurality of ride vehicles based on the ridership, the rider movement, or the ride readiness as determined by the controller.

2. The amusement park attraction system of claim 1, comprising the plurality of ride vehicles, wherein each ride vehicle of the plurality of ride vehicles comprises a plurality of seats, and each seat of the plurality of seats comprises a corresponding retro-reflective marker of the plurality of retro-reflective markers.

3. The amusement park attraction system of claim 2, wherein each seat of the plurality of seats comprises a respective array of retro-reflective markers, and wherein the controller is configured to monitor retro-reflection by the respective array of retro-reflective markers of each seat of the plurality of seats to determine whether each seat is occupied, or to monitor a degree of movement of a respective rider within each seat.

4. The amusement park attraction system of claim 1, wherein the array of retro-reflective markers is arranged to retro-reflect light in a pattern, and wherein the controller is configured to identify changes in the pattern to determine a degree of the rider movement.

5. The amusement park attraction system of claim 1, comprising a building housing the ride path, wherein the one or more emitters and the one or more detectors are located on a ceiling of the building.

6. The amusement park attraction system of claim 1, wherein the controller is configured to count a total number of riders on the plurality of ride vehicles by identifying which retro-reflective markers of the plurality of retro-reflected markers are occluded by riders.

7. The amusement park attraction system of claim 1, comprising the plurality of ride vehicles, wherein each ride vehicle of the plurality of ride vehicles comprises a ride door configured to secure a rider in the ride vehicle, wherein the ride vehicle includes a respective retro-reflective marker at an interface between a ride wall and a door wall, and wherein the controller is configured to evaluate a status of the ride door by detecting a change in light retro-reflected from the respective retro-reflective marker at the interface between the ride wall and the door wall.

8. The amusement park attraction system of claim 7, wherein the interface is located on the ride wall or on the door wall.

9. The amusement park attraction system of claim 7, comprising a loading station configured to allow riders to enter the plurality of ride vehicles, and wherein the controller is configured to allow the plurality of ride vehicles to leave the loading station in response to determining that a status of all ride doors indicates that the ride doors are closed.

10. The amusement park attraction system of claim 1, comprising the plurality of ride vehicles and the plurality of retro-reflective markers associated with the plurality of ride vehicles, wherein a portion of the plurality of retro-reflective markers is positioned around a perimeter of a boundary region of each ride vehicle, and wherein the controller is configured to monitor changes in the retro-reflected light retro-reflected by the portion of the plurality of retro-reflective markers to identify whether a rider has crossed into one of the boundary regions.

11. The amusement park attraction system of claim 10, wherein the controller is configured to cause the plurality of ride vehicles to stop in response to determining that the rider has crossed into one of the boundary regions.

12. The amusement park attraction system of claim 11, wherein the controller is configured to detect a wearable retro-reflective marker on a wristband worn by the rider to determine whether the rider crossed the boundary region or if the change in reflected light from the retro-reflective markers in the boundary region was due to an anomaly.

13. The amusement park attraction system of claim 10, wherein the controller is configured to cause a control panel associated with the plurality of ride vehicles to provide a visual and/or audible alarm in response to determining that the rider has crossed into one of the boundary regions.

14. The amusement park attraction system of claim 1, wherein an emitter of the one or more emitters and a detector of the one or more detectors are concentric to one another.

15. A method comprising:
emitting light toward retro-reflective markers positioned on a plurality of ride vehicles using one or more emitters, the plurality of ride vehicles being positioned on a ride path, wherein the retro-reflective markers comprise an array of retro-reflective markers positioned on a seat of a respective ride vehicle of the plurality of ride vehicles, wherein the seat of the respective ride vehicle is a portion of the respective ride vehicle whereon a passenger sits, and wherein the retro-reflective markers are configured to retro-reflect the emitted light back to the one or more emitters;
monitoring retro-reflected light from the retro-reflective markers using one or more detectors located relative to the ride path such that the one or more detectors are able to receive the retro-reflected light from the retro-reflective markers of the plurality of ride vehicles;
determining ridership, rider movement, or ride readiness of the plurality of ride vehicles based on identification of which of the retro-reflective markers of the plurality of ride vehicles are retro-reflecting light using a controller communicatively coupled to the one or more detectors; and
adjusting an operational parameter of the plurality of ride vehicles based on the determined ridership, rider movement, or ride readiness using the controller.

16. The method of claim 15, wherein determining ridership, rider movement, or ride readiness of the plurality of ride vehicles comprises determining whether the seat of the plurality of ride vehicles is occupied or determining a degree of movement of a respective rider within the seat by monitoring retro-reflection by a respective retro-reflective marker positioned on the seat.

17. The method of claim 16, wherein determining whether the seat is occupied or determining the degree of movement of the respective rider within the seat comprises identifying changes in a pattern of retro-reflected light produced by the array of retro-reflective markers positioned on the seat.

18. A system, comprising:
a tracking system configured to monitor a parameter of each ride vehicle of a plurality of ride vehicles based at least on identification and tracking of retro-reflective markers positioned on each ride vehicle of the plurality of ride vehicles, wherein the retro-reflective markers comprise an array of retro-reflective markers positioned on a seat of a respective ride vehicle of the plurality of ride vehicles, wherein the seat of the respective ride vehicle is a portion of the respective ride vehicle whereon a passenger sits, wherein the tracking system comprises:
a controller configured to monitor a change in intensity of retro-reflected light from the retro-reflective markers positioned on each ride vehicle of the plurality of ride vehicles to determine ridership, rider movement, or ride readiness of each ride vehicle of the plurality of ride vehicles based on identification of which of the retro-reflective markers of each ride vehicle of the plurality of ride vehicles are retro-reflecting light, and wherein the controller is configured to adjust an operational parameter of the plurality of ride vehicles based on the determined ridership, rider movement, or ride readiness.

19. The system of claim 18, wherein the controller is configured to identify changes in a pattern of retro-reflected light produced by the array of retro-reflective markers positioned on the seat, and to correlate the changes in the pattern to a degree of rider movement within the seat, to occupancy of the seat, or to proper securement of a rider in the seat.

20. The amusement park attraction system of claim 1, wherein the one or more detectors comprise an infrared camera.

* * * * *